US008636835B2

(12) United States Patent
Carew

(10) Patent No.: US 8,636,835 B2
(45) Date of Patent: *Jan. 28, 2014

(54) APPARATUS FOR GENERATING HYDROCARBON FUEL

(76) Inventor: Bayne Carew, Milford, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 13/568,809

(22) Filed: Aug. 7, 2012

(65) Prior Publication Data

US 2012/0315193 A1 Dec. 13, 2012

Related U.S. Application Data

(60) Division of application No. 12/270,282, filed on Nov. 13, 2008, now Pat. No. 8,147,590, which is a continuation-in-part of application No. 12/186,421, filed on Aug. 5, 2008, now Pat. No. 7,674,377, which is a continuation-in-part of application No. 11/942,525, filed on Nov. 19, 2007, now Pat. No. 7,513,372, which is a continuation-in-part of application No. 11/531,986, filed on Sep. 14, 2006, now abandoned, said application No. 12/186,421 is a division of application No. 10/863,798, filed on Jun. 8, 2004, now Pat. No. 7,122,123, which is a division of application No. 09/931,510, filed on Aug. 16, 2001, now Pat. No. 6,761,270.

(60) Provisional application No. 60/986,667, filed on Nov. 9, 2007, provisional application No. 60/225,895, filed on Aug. 17, 2000.

(51) Int. Cl.
*B01D 53/02* (2006.01)

(52) U.S. Cl.
USPC .............. 96/134; 95/107; 95/108; 366/165.3; 366/293

(58) Field of Classification Search
USPC .............. 95/107, 108; 96/134; 366/165.3, 293
See application file for complete search history.

(56) References Cited

U.S. PATENT DOCUMENTS

| 99,315 A | 2/1870 | Heermance |
|---|---|---|
| 1,414,132 A | 4/1922 | Hurrell |

(Continued)

FOREIGN PATENT DOCUMENTS

| EP | 0057670 A2 | 8/1982 |
|---|---|---|
| EP | 0159961 A1 | 10/1985 |

(Continued)

OTHER PUBLICATIONS

English translation to Russian Patent No. 2077925 C1, 1997.

(Continued)

*Primary Examiner* — Christopher P Jones
(74) *Attorney, Agent, or Firm* — Warner Norcross & Judd LLP

(57) ABSTRACT

An apparatus suitable for generating gaseous hydrocarbon fuel from a carbon based synthesis gas including a reaction chamber having a rotating shaft including a plurality of radial blades mixing and circulating carbon based synthesis gas and particulate catalyst upwardly generating gaseous hydrocarbon fuel, a stripping chamber located above the reaction chamber having a second axial rotating shaft including a plurality of radial blades driving hydrocarbon fuel radially outwardly, a source of hot stripping gas, an annular filter surrounding the stripping chamber and an annular gas collection chamber surrounding the filter. The blades in the stripping chamber are rotated independently at a greater velocity than the blades in the reaction chamber and the reaction is controlled by the temperature of the synthesis gas and the rotational velocity of the mixing blades in the reaction chamber.

9 Claims, 13 Drawing Sheets

(56) References Cited

U.S. PATENT DOCUMENTS

| | | |
|---|---|---|
| 1,768,465 A | 6/1930 | Hartley |
| 2,458,358 A | 1/1949 | Evans |
| 2,536,254 A | 1/1951 | Beckberger |
| 2,569,748 A | 10/1951 | DeGrave |
| 3,542,197 A | 11/1970 | Rosaen |
| 3,750,885 A | 8/1973 | Fournier |
| 3,937,281 A | 2/1976 | Harnsberger |
| 3,975,274 A | 8/1976 | Nommensen |
| 4,113,000 A | 9/1978 | Poisson |
| 4,173,527 A | 11/1979 | Heffley et al. |
| 4,178,246 A | 12/1979 | Klein |
| 4,199,454 A | 4/1980 | Sartore |
| 4,214,878 A | 7/1980 | Weiss |
| 4,227,576 A | 10/1980 | Calderon |
| 4,277,261 A | 7/1981 | Miko et al. |
| 4,292,178 A | 9/1981 | Mori et al. |
| 4,430,232 A | 2/1984 | Doucet |
| 4,621,069 A | 11/1986 | Ganguli |
| 4,690,761 A | 9/1987 | Orlans |
| 4,742,872 A | 5/1988 | Geske |
| 4,804,481 A | 2/1989 | Lennartz |
| 4,901,987 A | 2/1990 | Greenhill et al. |
| 4,938,869 A | 7/1990 | Bayerlein et al. |
| 5,188,041 A | 2/1993 | Noland et al. |
| 5,207,930 A | 5/1993 | Kannan |
| 5,229,014 A | 7/1993 | Collins |
| 5,240,605 A | 8/1993 | Winzeler |
| 5,736,007 A | 4/1998 | Duffy |
| 5,824,232 A | 10/1998 | Asher et al. |
| 6,761,270 B2 | 7/2004 | Carew |
| 7,182,921 B2 | 2/2007 | Miura et al. |
| 7,513,372 B2 | 4/2009 | Carew |
| 7,993,519 B2 | 8/2011 | Carew |
| 8,147,590 B2 | 4/2012 | Carew |
| 2007/0124997 A1 | 6/2007 | Liu et al. |
| 2008/0290018 A1 | 11/2008 | Carew |
| 2009/0001027 A1 | 1/2009 | Carew |

FOREIGN PATENT DOCUMENTS

| | | |
|---|---|---|
| EP | 0995475 A1 | 4/2000 |
| GB | 0527259 | 10/1940 |
| GB | 945614 A | 1/1964 |
| RU | 2077925 C1 | 4/1997 |
| WO | 9102578 A1 | 3/1991 |
| WO | 9307944 A2 | 4/1993 |
| WO | 2008030805 A1 | 3/2008 |

OTHER PUBLICATIONS

PCT International Search Report, International Application No. PCT/US01/25731; International Filing Date Aug. 16, 2001.

PCT International Search Report, International Application No. PCT/US2009/066415; International Filing Date Dec. 2, 2009, mailed Jan. 28, 2010.

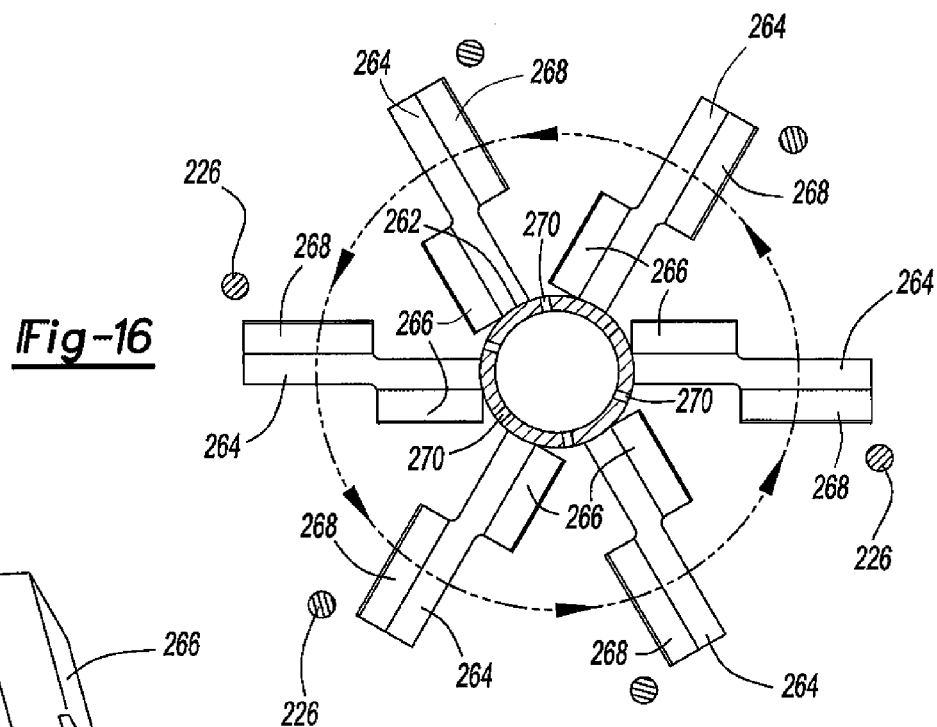
*Fig-16*
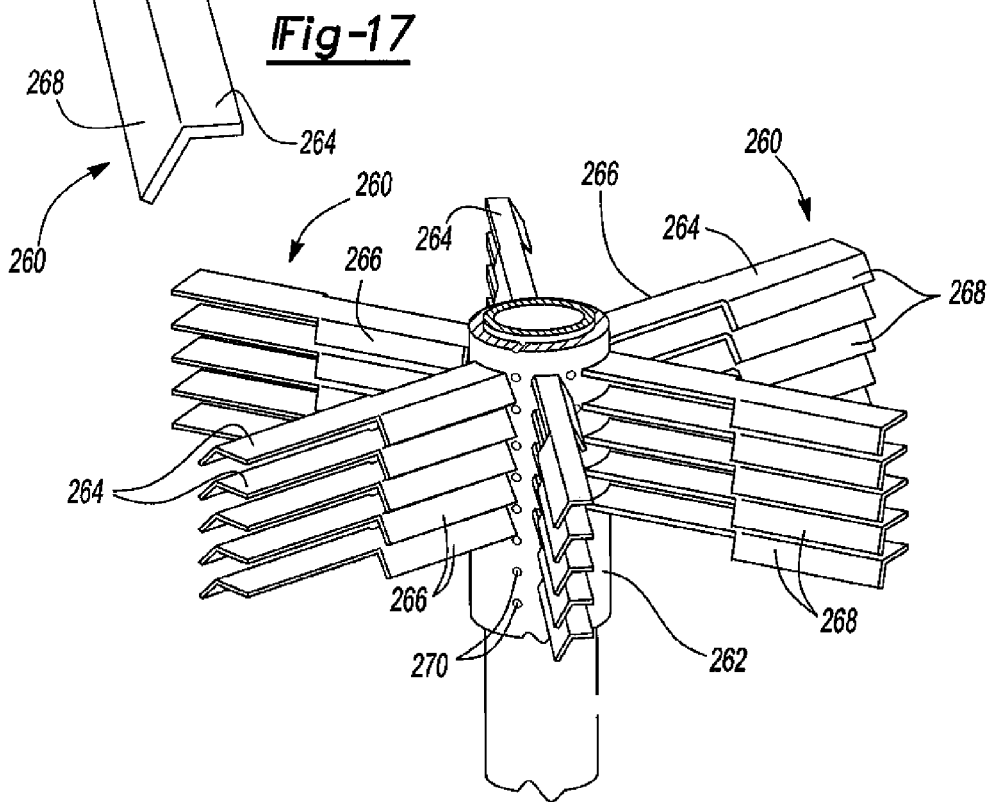
*Fig-17*
*Fig-18*

APPARATUS FOR GENERATING HYDROCARBON FUEL

RELATED APPLICATIONS

This application is a Divisional of U.S. application Ser. No. 12/270,282, which is a Continuation-in-Part application filed Nov. 13, 2008, now U.S. Pat. No. 8,147,590, issued Apr. 3, 2012 which application claims priority to U.S. Provisional Application Ser. No. 60/986,667 filed Nov. 9, 2007 and is a Continuation-in-Part application of U.S. Ser. No. 12/186,421, filed Aug. 5, 2008, now U.S. Pat. No. 7,674,377, issued on Mar. 9, 2010 which application was a Continuation-in-Part application of U.S. Ser. No. 11/942,525, filed Nov. 19, 2007, now U.S. Pat. No. 7,513,372, issued on Apr. 7, 2009 which application was a Continuation-in-Part application of U.S. Ser. No. 11/531,986, filed Sep. 14, 2006, which application was a Divisional application of U.S. Ser. No. 10/863,798 filed Jun. 5, 2004, now U.S. Pat. No. 7,122,123, issued Oct. 17, 2006, which application was a Divisional application of U.S. Ser. No. 09/931,510, filed Aug. 16, 2001, now U.S. Pat. No. 6,761,270, issued Jul. 13, 2004, which application claims priority to U.S. Provisional Patent Application No. 60/225,895, filed Aug. 17, 2000.

FIELD OF THE INVENTION

This invention relates to an apparatus suitable for generating gaseous hydrocarbon fuel from a carbon based synthesis gas, such as a mixture of carbon monoxide and hydrogen, sometimes referred to herein as syngas (synthesis gas) or fuel gas, or a fatty acid ester, sometimes referred to as biodiesel, or other partially oxidized bio-oils, or other partially oxidized bi-oils, including aldehydes, ketones and acids.

BACKGROUND OF THE INVENTION

Municipal, industrial and agricultural wastes and biosolids are potentially a rich source of carbon for power generation, as well as a primary source for the reformed synthesis gas (syngas), a mixture of carbon monoxide and hydrogen. These resources are discharge limit regulated. Such solids represent a significant percentage of a municipality's waste management budget which may be offset by converting these waste solids to fuel gas or directly into energy. The demand for renewable and alternative energy sources is a growing industry.

Carbon-based dry solids are currently convertible by gasification and turbo-electric power generation at a rate of three pounds per kilowatt (kW) at approximately 30% efficiency based on heat content of the gasses alone. However, if the gas chemical composition, for example carbon monoxide and hydrogen, of these gasifier fuel gases or syngas were to be used in a fuel cell operating at high temperatures, the efficiencies approximate 70%. A solid oxide fuel cell (SOFC), which depends upon this hot fuel gas, is one means to generate electrical power from chemical potential. Barriers to using SOFC presently include the high cost of stacked ceramic discs, their interconnects and exotic elements that are subject to corrosion from $CO_2/H_2O$ formed in the oxidation process. The apparatus of this invention, which generates designer hydrocarbon fuel from syngas, represents a desirable means to reach the 70% efficiency from these gasifier exhaust gasses. The designer fuel generator may be used to generate saturated or unsaturated hydrocarbons of substantially of any desired length, including but not limited to octane, and may be used in a substantially continuous process.

SUMMARY OF THE INVENTION

As stated above, the apparatus of this invention may be used to generate uniform gaseous hydrocarbon fuels from a carbon based synthesis gas, sometimes referred to herein as designer fuels. Thus, the apparatus of this invention may be used to generate hydrocarbon fuel from the effluent of the gas separator filter disclosed herein and in my above-referenced co-pending application Ser. No. 12/270,282, filed Nov. 13, 2008. The apparatus of this invention may be utilized, for example, to generate hydrocarbon fuel by the Fischer-Tropsch process by the following chemical equation:

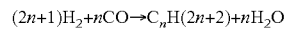

$$(2n+1)H_2 + nCO \rightarrow C_nH(2n+2) + nH_2O$$

wherein small "n" is a positive integer. As would be understood, the simplest form of this equation results in a formation of methane. However, octane and other designer fuels may also be generated.

The disclosed embodiment of the apparatus for generating gaseous hydrocarbon fuel from a carbon based synthesis gas of this invention includes a reaction chamber receiving heated carbon based synthesis gas including a first axial rotating shaft having a plurality of first radial blades mixing and circulating a carbon based synthesis gas and a fine particulate catalyst upwardly in the reaction chamber generating gaseous hydrocarbon fuel bound to the particulate catalyst. As discussed further below, the rotational space of the first radial blades and the axial length of the reaction chamber may be adjusted to generate hydrocarbon chains of any desired length. Carbon based synthesis gas, such as syngas or a fatty acid ester or other bio-oils are catalytically polymerized or otherwise modified in the reaction chamber in the presence of a fine particulate catalysts to form octane or diesel-hydrocarbons and the apparatus may be also be utilized to generate other hydrocarbon fuel chains of various lengths and unsaturate hydrocarbons. Syngas monomers in the presence of cobalt are known to polymerize under controlled temperature conditions, preferably near 250° C., but occasionally in the 350° C. range. Fatty acid esters or other bio-oils are known to deoxygenate in the presence of zeolite ZSM-5 to form diesel fuels and may co-polymerize with other hydrocarbons, such as acetylene, in the presence of metal cobalt or other catalyst. As known by those skilled in this art, the polymerization reaction is exothermic and temperature control is thus essential to control the product outcomes. The incoming gases must, however, be continuously mixed with a solid phase catalyst to achieve product homogeneity. The multistage reactor of this invention includes an intrinsic and continuous means of contaminant removal (oxides of carbon, nitrogen, sulfur and $H_2O$) from syngas reactants ($CO/H_2$) and products. The carbon based synthesis gas is preferably heated prior to injection or circulation into the reaction chamber, such as by injecting the synthesis gas into the reaction chamber through a conventional air torch. Where the feed gas is syngas, the catalyst adsorbs and deoxygenates incoming carbon monoxide, replacing the oxygen with $H_2$ to form a —$CH_2$— reactive radical. Similarly, where the feed gas is a fatty acid ester, the catalyst deoxygenates the feed gas to form diesel fuels usually in the $C_{14}$ to $C_{16}$ range but sometimes in the $C_6$ to $C_{12}$ range. This process repeats itself with hydrogen chains lengthened as new $CH_2$— radicals are added. However, experimental data would indicate that this chain lengthening is dependent upon maintenance of the most active (reduced, presumably electrophyllic) state. In order to preserve and maintain uniformity of catalytic surfaces, provisions in this apparatus are made to periodically restore the catalysts active surface as described below.

The disclosed embodiment of the apparatus of this invention also includes a stripping chamber located above the reaction chamber receiving gaseous hydrocarbon fuel and fine particulate catalysts from the reaction chamber. The stripping chamber includes a second axial rotating shaft having a plurality of second radial blades driving gaseous hydrocarbon fuel product radially outwardly through an annular filter surrounding the stripping chamber. In the disclosed embodiment, the annular filter may be identical to the filter disclosed in the related applications which is a continuous flexible resilient helical coil having a regular sinusoidal shape in the direction of the helix. In the disclosed embodiment, the helical coil includes flat top and bottom surfaces having radial notches preferably defining micropores having filter pore diameter less than a particle size of the catalyst particles which, as discussed below, typically has a particle size in the micron range. A source of hot stripping gas, such as nitrogen, is directed into the stripping chamber stripping gaseous hydrocarbon fuel from the fine particulate catalysts and the rotating second blades thus driving the separated gaseous hydrocarbon fuel radially through the annular filter.

In the disclosed embodiment, the reaction chamber is surrounded by a first impervious tubular baffle and the stripping chamber is surrounded by a tubular baffle having radial openings, preferably having a pore size less than the particle size of the catalytic particles. In this embodiment, the second radial blades circulate the catalytic particles upwardly over the tubular baffle into an annular particle collection shaft surrounding the first and second tubular baffles. Further, in this embodiment, the annular filter surrounds the annular particle collection chamber and the apparatus includes an annular gas collection chamber surrounding the annular filter receiving gaseous hydrocarbon fuel through the annular filter. The apparatus filter includes a gas outlet communicating with the gas collection chamber directing gaseous hydrocarbon fuel out of the apparatus.

In the disclosed embodiment of the apparatus of this invention, the first and second axial rotating shafts and their associated radial blades are driven by separate motor at different rotational speeds permitting controlling of the reaction time in the reaction chamber as described above. In the disclosed embodiment, the blades are turbine blades fixed relative to the vertical at an angle of less than 30°, more preferably between 10° and 20° and about 15°. The second plurality of radial blades is preferably rotated at a much greater velocity than the first plurality of radial blades. Upon the reaching the high speed, second radial blades of the stripping chamber, the catalysts and bound gaseous hydrocarbon fuel are subjected to large G-forces which may be in excess of 10,000 at the same time that a hot reducing gas is introduced into the stripping chamber. In the disclosed embodiment, the second axial rotating shaft of the stripping chamber is hollow and includes radial ports opening into the stripping chamber. An air torch or other apparatus to heat gas then directs heated gas into the stripping chamber as described above. The catalyst particles are recycled by circulating the particles up and over the tubular baffle surrounding the stripping chamber and transports downwardly through the annular particle collection chamber surrounding the first and second tubular baffles into a collection area surrounding the first tubular baffle and the recycled catalyst is then funneled upwardly in the up draft of the reaction chamber by the first plurality of radial blades in the reaction chamber. It should also be noted that water which would interfere with the polymerization reaction is continuously moved in the reactor column along with the fuel product in the stripping chamber. Stripping water is continuously removed from the products and other contaminants are removed from the incoming syngas. This is an important feature of the centrifugal filter apparatus of the present invention. The water generated by the reaction above occurs under pressure and temperatures well above the boiling point of water, such that it is drawn off with the hydrocarbon vapor product. The water would interfere with the catalyst.

Other advantages and meritorious features of the apparatus of this invention will be more fully understood in the following description of the preferred embodiments and the appended drawings. As will be understood by those skilled in the art, however, various modifications may be made to the disclosed embodiments in the purview of the appended claims and the following description of the preferred embodiments are for illustrative purposes only. Further, the terms used for the components of the apparatus of this invention, such as the reaction chamber and stripping chamber, are for ease of description only and do not limit the function or use of such components. For example, the stripping chamber may also serve as a reaction chamber.

BRIEF DESCRIPTION OF THE DRAWINGS

FIG. 16 is a partial top view of FIG. 13 in the direction of view arrows 16-16;

FIG. 17 is a perspective top view of a mixer blade shown in FIGS. 13-16;

FIG. 18 is a top perspective view of a plurality of mixing blades mounted on a central shaft as shown in FIGS. 13-16;

DETAILED DESCRIPTION OF THE INVENTION

As set forth above, the embodiments of the filter apparatus and method of this invention disclosed in the following description of the preferred embodiments are for illustrative purposes only and various modifications may be made to such embodiments within the purview of the appended claims. Referring to the figures, wherein like numerals indicate like or corresponding parts throughout the several views, one embodiment of a filter apparatus for filtering a fluid is generally disclosed at 10 in FIGS. 1 to 6. In the Figures, it is understood that the filter apparatus 10 and method of this invention are capable of filtering both liquids and gases as the fluid. However, the embodiment of the filter apparatus 10 of the subject invention is more preferably used to filter fluids having solid particles including, without limitation, slurries of biological or organic waste, including oils. As such, the filter apparatus 10 may be used in combination with other devices, including ion exchange or chelation affinity apparatus or a filter press as discussed further below.

Figure 1:
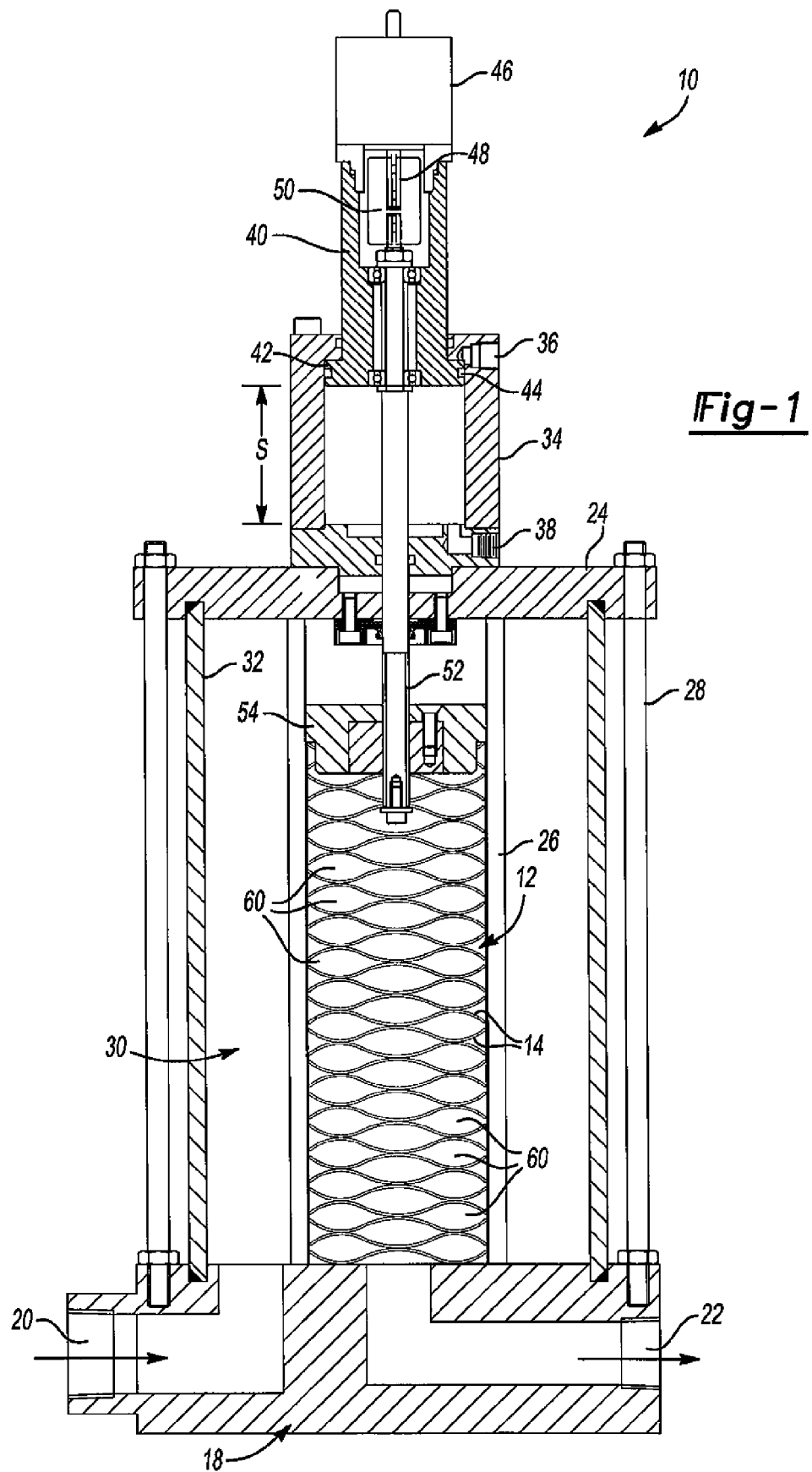
FIG. 1 is a partially cross-sectioned side view of one embodiment of a filter assembly of this invention with the filter element fully expanded.
Figure 2:
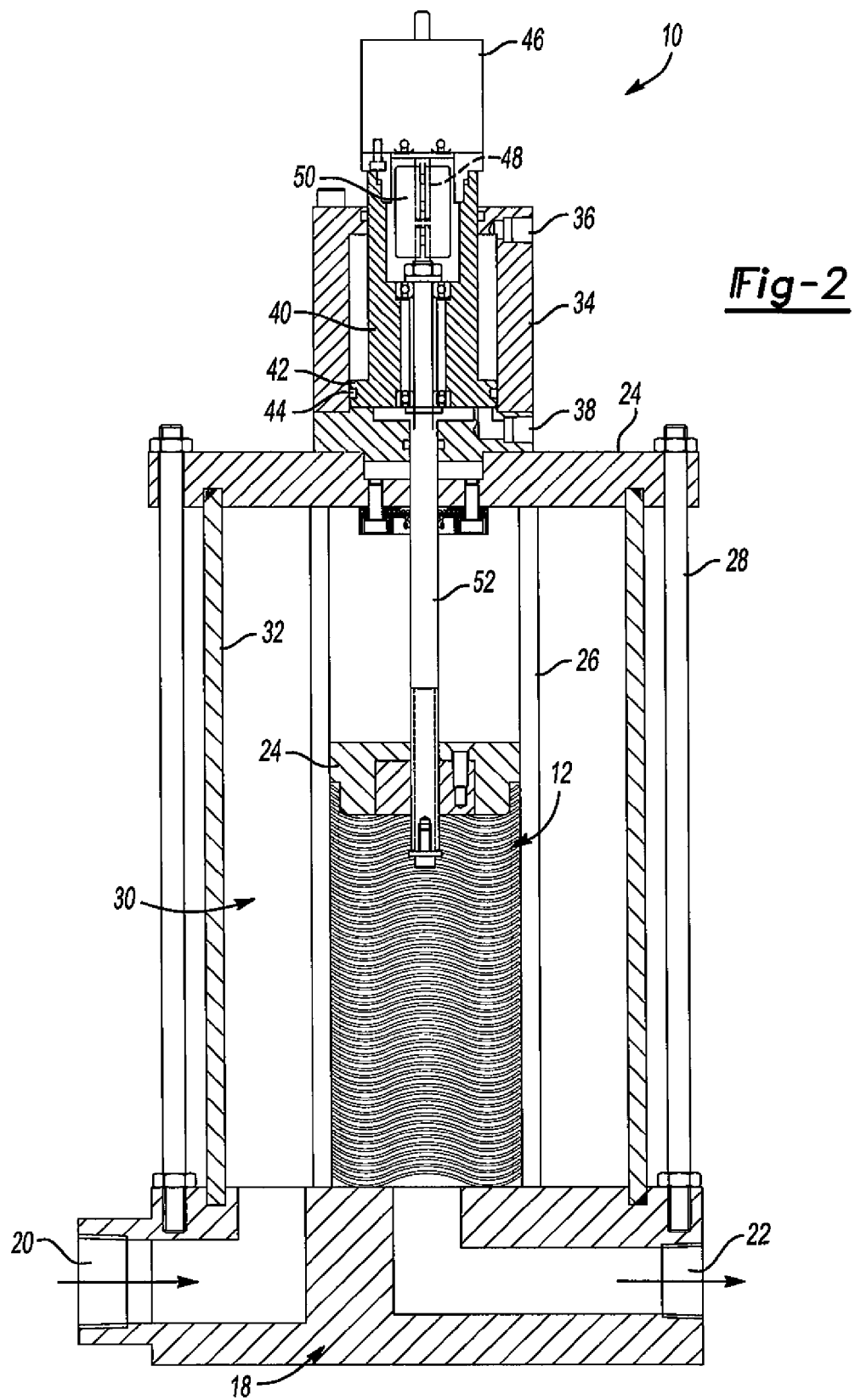
FIG. 2 is a partially cross-sectioned side view of the filter assembly shown in FIG. 1 with the coils of the filter in registry and substantially compressed.
Figure 3:
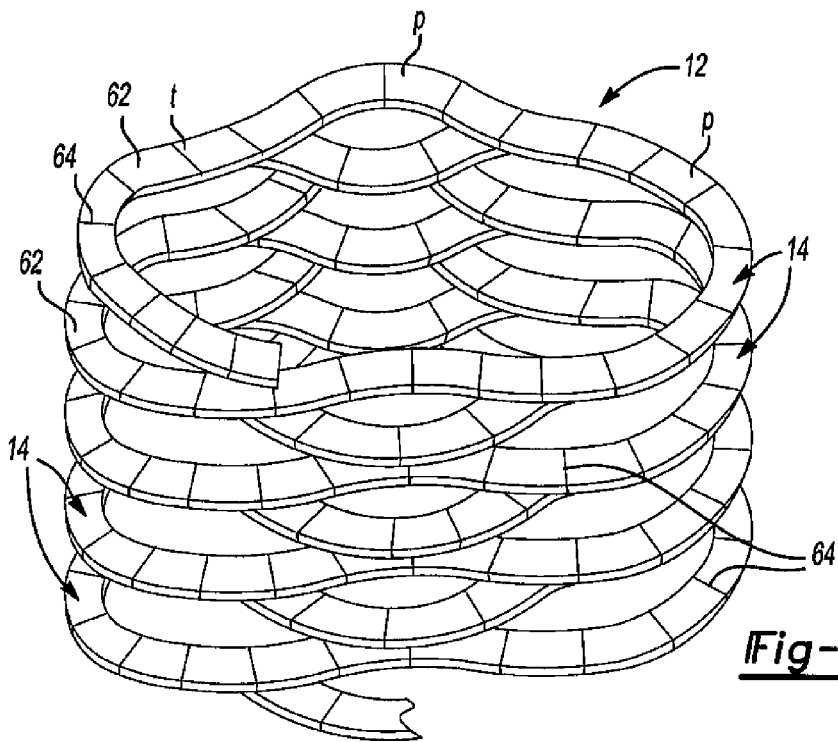
FIG. 3 is a partial top perspective view of the filter element shown in FIG. 1.
Figure 4:
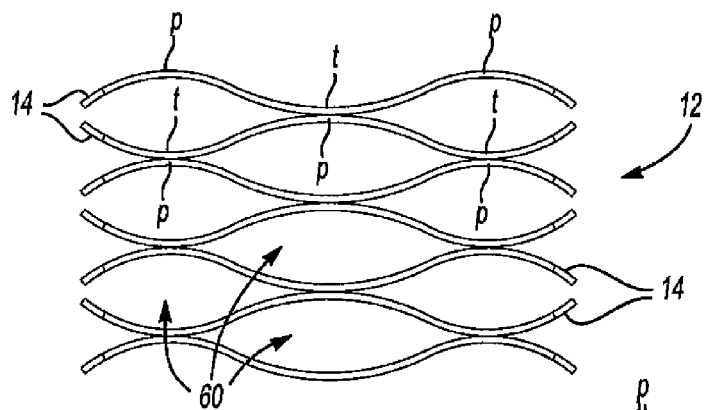
FIG. 4 is a partial side view of the expanded filter element shown in FIG. 1.

FIGS. 1 to 6 illustrate one embodiment of the filter assembly 10 of this invention which may be utilized to perform the methods of filtration described herein. The filter assembly 10 shown in FIGS. 1 and 2 includes an annular filter element 12 including a continuous generally cylindrical helical coil having a plurality of circular interconnected helical coils 14 as best shown in FIG. 3, wherein each generally circular helical coil has a plurality of regular sinusoidal wave forms or shapes including circumferentially spaced peaks and troughs as shown in FIG. 3. The peaks "p" and troughs "t" of adjacent coils 4 are in contact to provide enlarged "loop-shaped" or eyelet-shaped filter pores between adjacent coils as shown in FIG. 4, or the peaks "p" and troughs "t" of adjacent coils 14 may be aligned as shown for example in FIG. 6 as described below.

The filter assembly 10 shown in FIGS. 1 and 2 includes a lower housing 18 having an inlet 20 and an outlet 22 for receiving a fluid stream to be filtered, such as a waste gas or liquid stream as described above. The filter assembly 10 further includes a cover 24 which is supported on the lower housing member 18 by circumferentially spaced inner and outer retention posts 26 and 28, respectively. A filtration chamber 30 is defined between the lower housing member 18 and the cover 24 by a cylindrical housing wall 32. Thus a fluid stream received through inlet 20 is received under pressure in the filtration chamber 30 for filtration by the filter element 12. The fluid stream including contaminants is then received through the filter pores or the radial grooves as described below through the filter element 12 into the axial center of the filter element 12 and the filtrated fluid is then discharged through the outlet 22. As described above, the particles, molecules or material removed by the filter element are removed by backwashing as further described below.

This embodiment of the filter assembly 10 shown in FIGS. 1 and 2 further includes a pneumatic cylinder 34 attached to and supported on the cover 24 of the housing having an air inlet 36 and an air outlet 38. A piston assembly 40 is reciprocally supported in the pneumatic cylinder or chamber 34 including a piston head 42 having an O-ring 44, such that the piston assembly 40 is sealingly supported within the pneumatic cylinder 34. The piston assembly 40 has a stroke "S" as shown in FIG. 1. Pneumatic pressure supplied through air inlet 36 of the pneumatic cylinder 34 will thus drive the piston assembly 40 downwardly from the position shown in FIG. 1 to the position shown in FIG. 2 as described in more detail hereinbelow.

In this disclosed embodiment, the filter assembly 10 further includes a drive assembly engaging the helical coil filter element 12 moving adjacent coils 14, thereby modifying and controlling a volume of the loop-shaped filter pores between adjacent coils as now described. In this disclosed embodiment, the filter assembly 10 includes a stepper motor 46 attached to and supported by the upper end of the piston assembly 40 as shown in FIGS. 1 and 2. As will be understood by those skilled in this art, a stepper motor is a brushless, synchronous electric motor that can divide a full rotation into a large number of steps. When commutated electronically, the motor's position can be controlled precisely, without any feedback mechanism. Although a stepper motor has several advantages for this application, any other type of rotary drive may also be utilized. The driveshaft 48 of the stepper motor 46 is connected in the disclosed embodiment to an upper end of the cylindrical helical filter element 12 to relatively rotate the filter coils to accurately control the volume of the loop-shaped filter pores 60 as described below. The driveshaft 48 of the stepper motor 46 in the disclosed embodiment is connected to a coupling 50 as shown in FIGS. 1 and 2. A shaft 52 connected to the coupling 50 is connected to a clamp assembly connected to the upper end of the filter element 12. The lower end of the filter element 12 is rigidly connected to the lower housing member 18 such that, upon rotation of the clamp assembly 54 by the stepper motor 46, the coils 14 of the filter element 12 are rotated relative to each other as described below.

In the first disclosed embodiment, the circular interconnected coils 14 of the filter element 12 are initially aligned crest or peak "p" to trough "t" as shown in FIG. 4 with the filter pores or openings 60 enlarged to their maximum. Alternatively, it would also be possible to initially align the coils peak to peak and trough to trough. It is important to understand, however, that the width or amplitude of the sinusoidal wave or curve has been greatly exaggerated in FIGS. 1, 3 and 4 for a better understanding of the filter assembly of this invention and the method of filtration. As set forth above, the volume of the openings or loop-shaped filter pores 60 of the filter element 12 in the filter apparatus of this invention may be accurately controlled to filter different fluids. First, the piston assembly 40 may simply be extended to compress the filter element, thereby reducing the size or volume of the filter pores 60 by supplying air under pressure through the inlet 36 of the pneumatic cylinder 34. However, in one preferred embodiment, the drive 46 rotates at least one of the coils 14 relative to the remainder of the coils, thereby relatively sliding the opposed flat top and bottom surfaces of adjacent coils relative to each other into and out of registry, thereby accurately controlling the volume of the loop-shaped pores 60. Further, because the filter element 12 is formed of a stiff resilient metal, such as stainless steel, the loop-shaped filter pores 60 are all modified simultaneously, such that all filter pores have essentially the same volume, which is important for accurate control.

Figure 5:
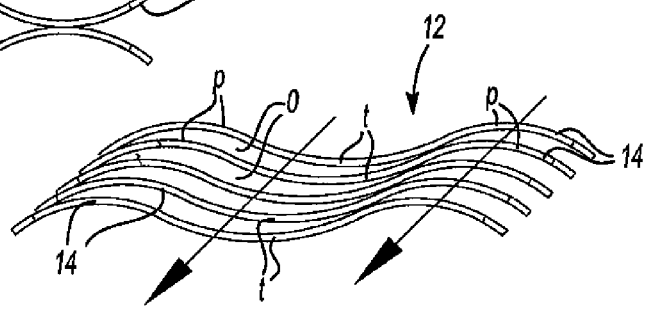
FIG. 5 is a partial side view of the filter element shown in FIG. 4 with the filter coils partially in registry, reducing the size of the filter pores.
Figure 6:
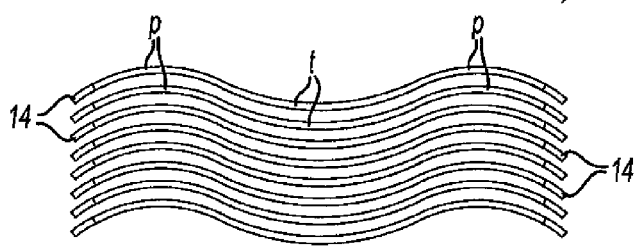
FIG. 6 is a partial side view of the filter elements shown in FIGS. 4 and 5 with the filter coils in full registry as shown in FIG. 2.

As best shown in FIG. 5, rotation of the upper coil of the continuous cylindrical helical coil filter element 12, by rotation of the driveshaft 48 of the stepper motor 46 causes the peaks "p" of adjacent coils to rotatably slide on the flat upper and lower surfaces 62 relative to the remaining coils, reducing or expanding the apertures or filter pores 60. Finally, as shown in FIG. 6, the sinusoidal-shaped coils may be moved or rotated into full registry, such that the peaks "p" and troughs "t" are fully aligned. Again, however, the spacing between adjacent coils 14 has been exaggerated in FIG. 6 for clarity. In fact, the adjacent coils may be in full contact, such that the filter pores 60 between adjacent filter coils is reduced to essentially zero. However, in the disclosed embodiment, at least one of the opposed flat surfaces 62 of the filter coils 14 includes circumferentially spaced radial grooves 64, which may be formed by laser etching permitting the flow of fluids through the filter element when the filter pores 60 between adjacent coils are reduced to substantially zero. Thus the radial grooves or notches 64 significantly increase the applications for the filter assembly 10 of this invention.

Having described the embodiment of the filter assembly 10 of this invention as shown in FIGS. 1 to 6, the operation of the filter assembly 10 may now be described. In one embodiment of the filter apparatus 10 of this invention, the filter element 12 is a continuous substantially cylindrical resilient helical coil having a regular sinusoidal shape including regular peaks "p" and troughs "t" as described above. The filter element may be formed of stainless steel, such as 316 stainless steel, which is stiff and resilient. However, the helical coil filter element may also be formed of a Hastaloy or other steel or even plastic. Another advantage of stainless steel is corrosion resistance. The coil preferably is formed from flat metal stock having flat top and bottom surfaces 62, such that the flat surfaces of adjacent coils will slide against each other during rotation as best shown in FIGS. 4 to 6. A suitable thickness between the flat top and bottom surfaces 62 is 0.4 to 2 mm having a width of between 3 and 6 mm. The preferred number of sinusoidal waves of each coil will depend upon the application. However, it has been found that between 3 and 10 sinusoidal curves or waves for each coil 14 will be very suitable for most applications. Further, the "width" of the loop-shaped openings or filter pores will also depend upon the application, but it has been found that filter pores having a maximum width of about 0.5 mm is suitable for most applications. Finally, the depth of the radial grooves 64, which may be formed by laser etching, is preferably between about 0.1 to 10 microns. However, in the embodiment of the organic filtration apparatus 210 described below, the radial grooves or laser etched micropores may have a diameter in the nanometer range.

The filter assembly 10 is thus operated by adjusting the apertures or loop-shaped filter pores 60 to the desired volume for filtration depending upon the fluid to be filtered by either extending the shaft 52 using pneumatic pressure through inlet port 36, driving the piston assembly 40 downwardly in FIG. 1 to compress the coils against each other, thereby reducing the volume of the filter pores 60 or by retracting the shaft 52 using pneumatic port 38 to increase the volume of the filter pores. However, in one preferred embodiment, the stepper motor 46 may be simultaneously rotated to bring the peaks "p" and troughs "t" into and out of registry as shown, for example, in FIG. 5. As described above, rotation of the upper coil will simultaneously rotate all coils relative to the bottom coil because the filter element is formed of a stiff resilient material, such as 316 stainless steel. The coils may be rotated into full registry, as shown in FIG. 6, wherein the filter pores are reduced to substantially zero and wherein the fluid flow is only through the radial grooves 64. The fluid to be filtered is then received through the housing inlet 20 into the filter chamber 30 and flows through the filter element 12 as shown in FIG. 2. As will be understood, the filter apparatus may be used to filter almost any fluid depending upon the filter pore size including, for example, residential, industrial and agricultural waste and sludges to produce, for example, potable water from waste and may be used for the clarification and refinement of waste oil from waste water-oil mixtures, etc. Upon completion of the filtering process or when the filter element 12 becomes clogged with the particles or media suspended in the fluid, the filter element 12 may be easily flushed by opening the filter pores 60 as shown in FIG. 1 and flushing solution is then received through the outlet 22 and flushed through the filter element 12. In the disclosed embodiment, backwashing may be facilitated by rotating the stepper motor in the opposite direction from the direction used to compress the coils 14 of the filter coil while maintaining the clamp assembly 54 in the extended position as shown in FIG. 2. Then, upon completion of the filtering process, the filter element is "opened" by simply retracting the clamp 54 to the open position shown in FIG. 1 which can be accomplished in a second or two.

The second embodiment of the filter apparatus 110 of this invention illustrated in FIGS. 7 to 12 may be characterized as a centrifugal filter apparatus or more specifically a dual-chambered centrifugal and compressive filtration apparatus for separating waste solids from fluids including, for example, waste solids in oils, water and gas. The elements of the centrifugal filter apparatus 110 are numbered where appropriate in the same sequence as the filter apparatus 10 described above, but in the 100 series to reduce the requirement for a detailed description of like components. The disclosed embodiment of the filter apparatus 110 includes a central annular filter element 112 which, in the disclosed embodiment, is a continuous flexible resilient generally cylindrical helical coil including a plurality of interconnected generally circular helical coils 114 as described above with reference to the filler element 12. However, the centrifugal filter apparatus of this invention may alternatively include any conventional annular generally cylindrical filter element although the helical filter element 112 is preferred in many applications.

The filter apparatus 110 includes a lower housing member 118 and a base member 119, an inlet 120, a supernatant outlet 121 and a solids outlet 122 through base member 119. The disclosed embodiment of the filter apparatus 110 further includes upper housing members 123, 124 and 125, which are retained to the lower housing member 118 by circumferentially spaced retention posts. This disclosed embodiment includes a first annular filtration chamber 130 surrounding the annular filter element 112 and a second filtration chamber 131 within the annular filter element 112 as further described below. The first filtration chamber 130 is defined by the cylindrical housing wall 132 defining a cylindrical inner surface 133. In the centrifugal filter apparatus 110 of this invention, the internal wall 133 of the cannister housing is preferably cylindrical to accommodate the centrifugal fins described below.

The disclosed embodiment of the filter apparatus 110 includes a first pneumatic port 136 adapted to compress the helical filter element 112 and a second pneumatic port 138 adapted to expand the helical filter element as described below. The apparatus further includes a pneumatic cylinder 134 receiving a piston 140 actuated by pneumatic pressure through the pneumatic ports 136 and 138 as described below. The disclosed embodiment of the filter apparatus 110 further includes a motor 142, such as a stepper motor described above, for rotating one or more of the helical coils 114 relative to a remainder of the helical coils into and out of registry to finely adjust the eyelet-shaped filter pores 160 between adjacent helical coils 114 as also described above. In this embodiment, the motor 142 includes a drive shaft assembly 144 connected to a drive gear 146. The drive gear 146 rotatably engages a driven gear 148 which is connected to a tubular driven shaft 150 connected to the upper helical coil 114 as described above with regard to the filter apparatus 10.

In one preferred embodiment, the helical filter element 112 includes both a first filter drive compressing or expanding the helical filter element and a second drive rotating one or more of the helical coils 114 into and out of registry for very accurately controlling the volume of the filter pores 116 between adjacent helical coils 114. In the disclosed embodiment, the first drive is a pneumatic drive, wherein pneumatic pressure received through inlet pneumatic port 136 drives the piston 140 downwardly in FIG. 7 to compress the helical filter element 112. Alternatively, the first drive may be hydraulic. An advantage of a pneumatic filter drive is that the compression on the helical filter element 112 may be released quickly during purging. Detailed or accurate control of the volume of the filter pores 116 in this embodiment is controlled by the second drive which, in the disclosed embodiment, is a stepper motor 142. The stepper motor 142 rotates the drive shaft 144, which rotates the drive gear 146. The drive gear 146 rotates the driven gear 148 and the tubular drive shaft 150 connected to the upper end of the helical filter element 112 to rotate at least one of the helical coils 114 relative to a remainder of the helical coils, thereby rotating the helical coils into and out of registry as described above. FIG. 8 illustrates the filter apparatus 110 after closing the filter pores 160 using the pneumatic adjustment mechanism and rotating the helical filter coils 114 into registry as described above with reference to FIG. 2.

Figure 7:
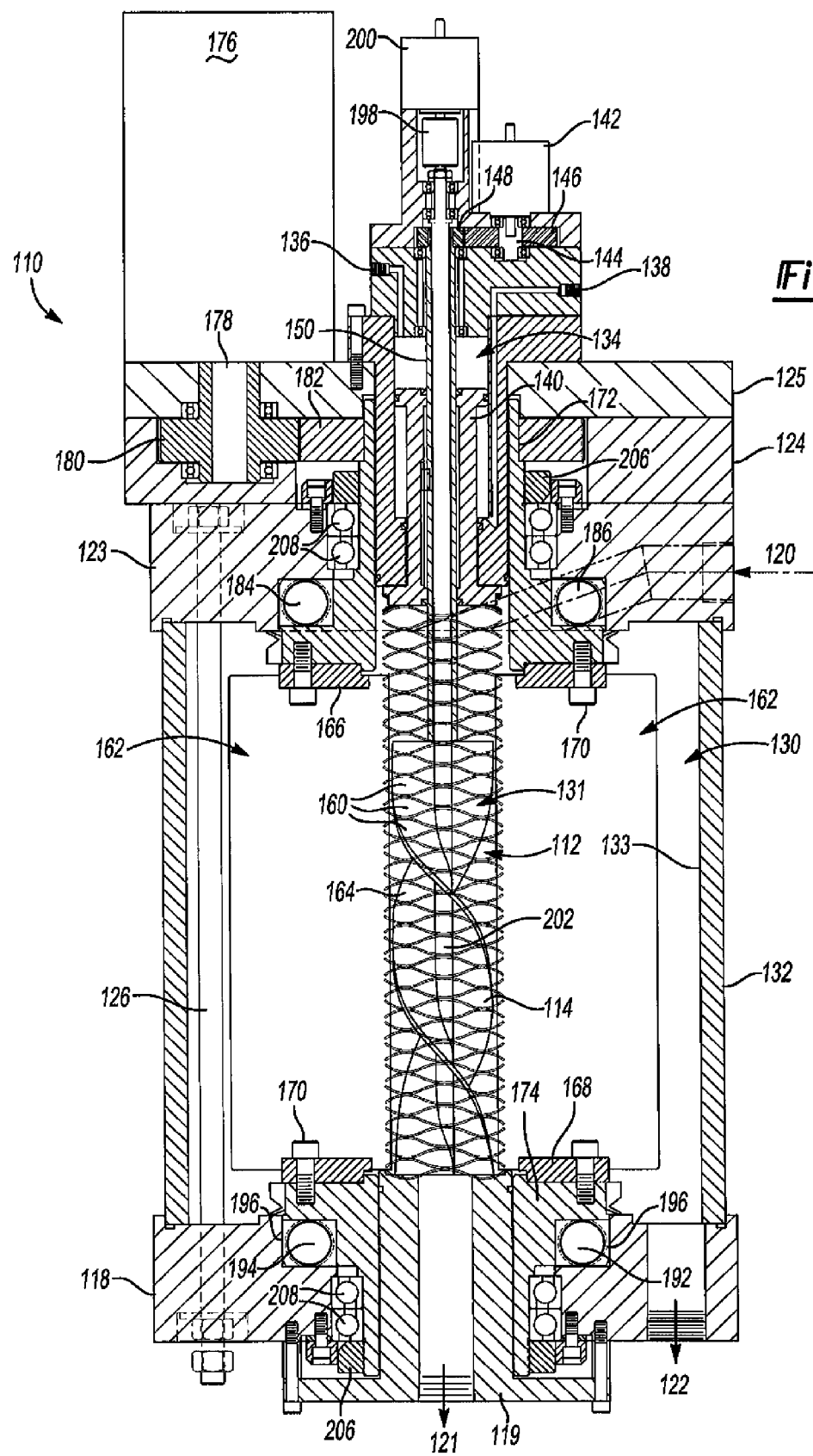
FIG. 7 is a partial side cross-sectional view of a centrifugal filter apparatus of this invention with the helical filter element fully expanded.
Figure 8:
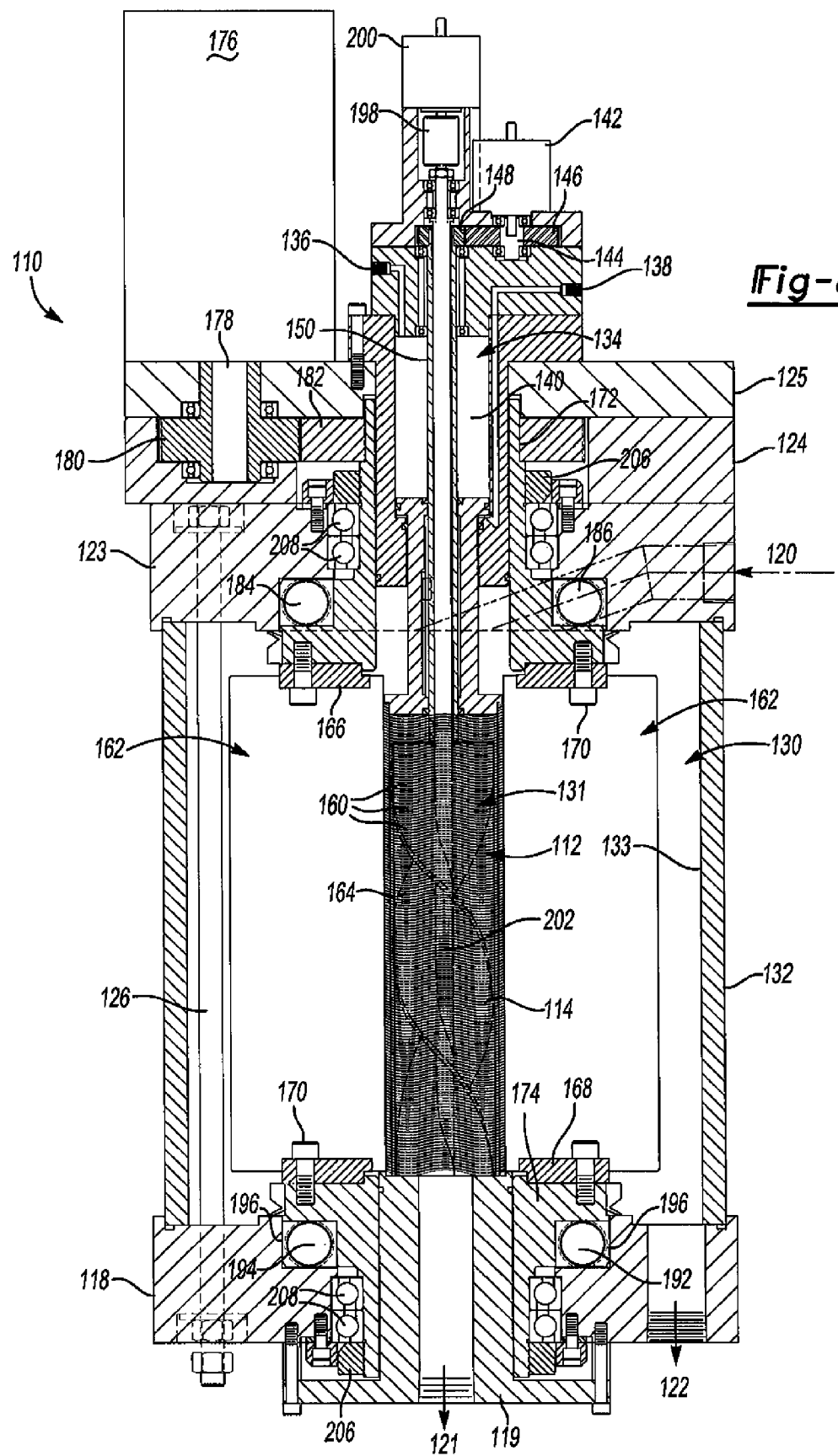
FIG. 8 is a side partially cross-sectional view of the centrifugal filter apparatus shown in FIG. 7 with the helical filter element fully compressed.
Figure 9:
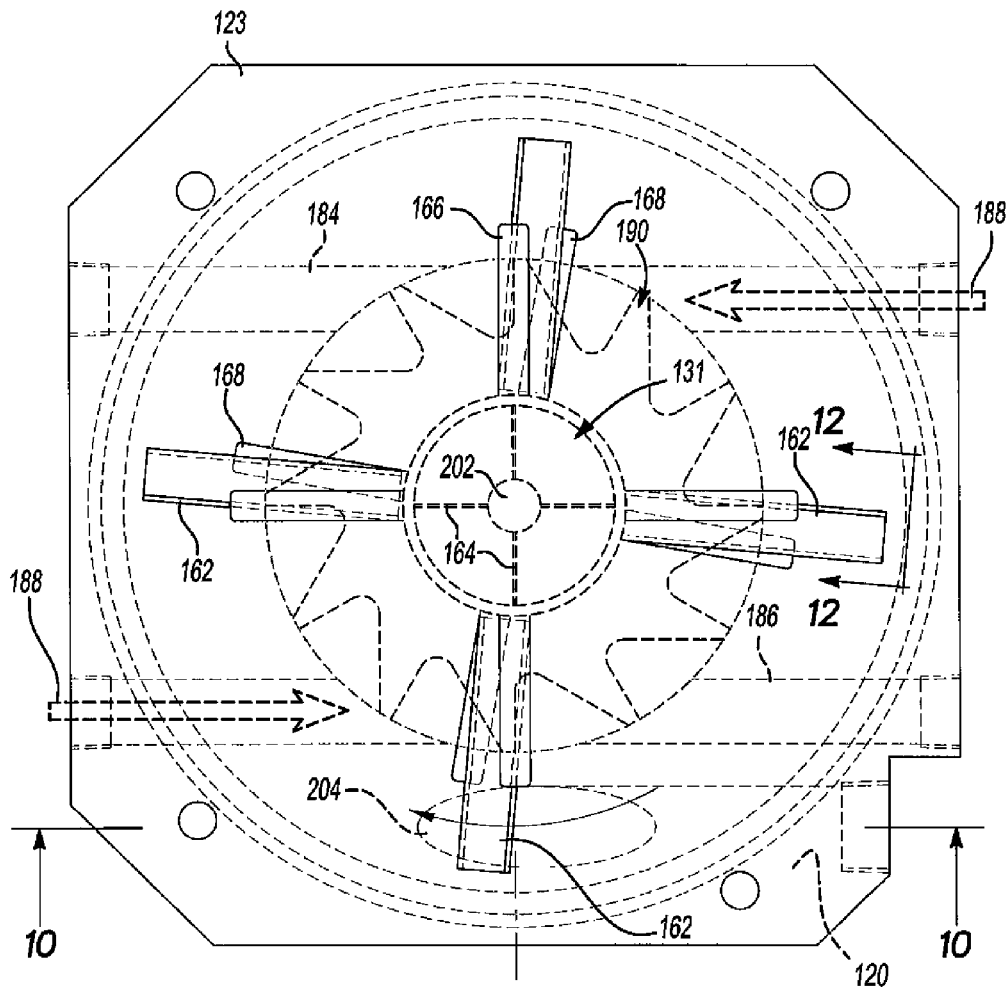
FIG. 9 is a top plan view of the filter assembly shown in FIGS. 7 and 8 with the motors removed.
Figures 11, 12:
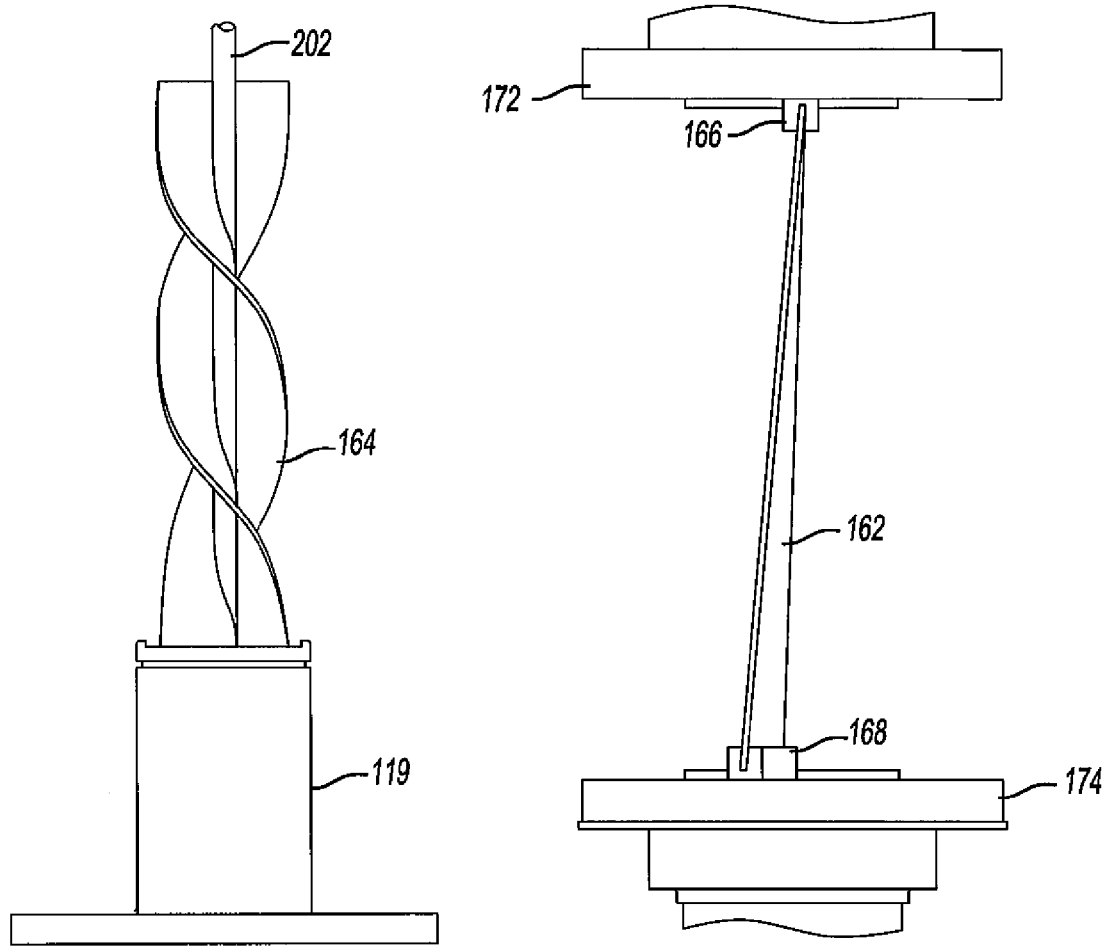
FIG. 11 is a partial side view of the internal radial centrifugal fins.
FIG. 12 is a partial side view of FIG. 9 in the direction of view arrows 12-12.

In the disclosed embodiment of the centrifugal filter apparatus 110 of this invention, the apparatus includes external rotating centrifugal radial fins 162 shown in FIGS. 7 and 8 and internal rotating centrifugal radial fins 164 shown in FIGS. 9 and 11. As described below, the external and internal centrifugal radial fins 162 and 164, respectively, cooperate during filtration and purging of the helical filter element 112 to significantly improve filtering by the filtering apparatus of this invention. In the disclosed embodiment of the centrifugal filter apparatus 110, the external centrifugal radial fins 162 are rigidly supported by upper bracket members 166 and lower bracket members 168 by bolts 170 as shown in FIGS. 7 and 8. The upper bracket member 166 is also rigidly connected by bolts 170 to the upper spindle 172 and the lower bracket members are rigidly connected to the lower spindle member 174 by bolts 170. The upper spindle 172 is rotatably driven by electric motor 176. The drive shaft 178 of the electric motor is fixed to an external drive gear 180, which drives a driven gear 182 fixed to the upper spindle 172. Thus, the electric motor 176 rotatably drives the upper spindle 172 which rotates the external centrifugal radial fins 162 within the outer or first filtration chamber 130.

In the disclosed embodiment of the centrifugal filter apparatus 110, the external centrifugal radial fins 162 are also driven by pneumatic pressure as also shown in FIG. 9. As shown in FIG. 9, the upper housing member 123, which serves as a cover for the filter cannister, includes two pneumatic channels 184 and 186, which have a circular cross-section as shown in FIGS. 7 and 8. Air under pressure is injected into the pneumatic channels 184 and 186 in opposite directions as shown by the arrows 188 to turn the turbine blade 190 at the outer surface of the spindle 172 as shown at 190 in FIG. 7. Thus, pneumatic pressure injected through pneumatic ports 184 and 186 rotate the external centrifugal radial fins 162. In the disclosed embodiment, the lower spindle 174 is also pneumatically driven. The lower spindle includes pneumatic channels 192, 194 which drive a turbine 196 as described above with regard to the pneumatic channels 184, 186 and turbine 190.

As will be understood from the above description of the drives for the external centrifugal radial fins 162, the fins may be rotatably driven by the motor 176 or pneumatic pressure injected through pneumatic ports 136 and 138 in the upper spindle 172 and through ports 192 and 194 through the lower spindle 174. As will be understood by those skilled in this art, the motor drive and the pneumatic drives may be used in combination depending upon the type of motor 176 or independently depending upon the conditions. For example, where the waste being filtered by the centrifugal filter apparatus 110 must be continuous, the pneumatic drive may be used as a back-up in the event of an electrical power failure.

In the disclosed embodiment of the centrifugal filter apparatus 110 of this invention, the internal centrifugal radial fins 164 as shown in FIGS. 9 and 11, are rotatably driven by electric motor 198 shown in FIGS. 7 and 8. The motor 198 is supported in a housing 200. The drive shaft of the motor 198 rotatably drives rod 202 and the internal centrifugal radial fins 164 are mounted on the rod 202 as shown in FIG. 9. Thus, the motor 198 rotates the internal centrifugal radial fins 164 independently of the external centrifugal radial fins 162.

Figure 10:
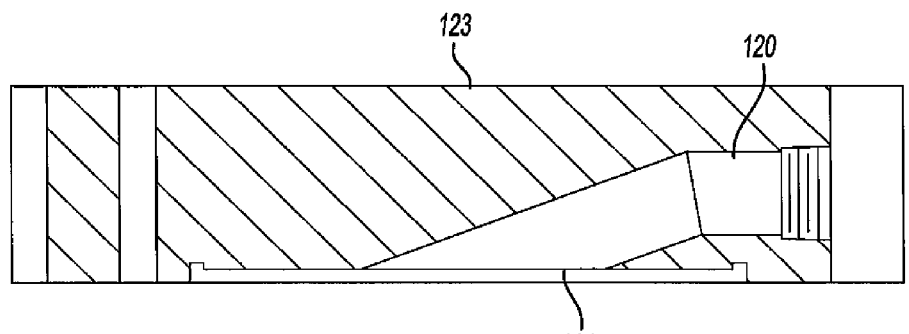
FIG. 10 is a cross-sectional view of FIG. 9 in the direction of view arrows 10-10.

In the disclosed embodiment of the centrifugal filter apparatus 110, both the external and internal centrifugal radial fins 162 and 164, respectively, are canted relative to the axis of rotation of the fins to drive liquid in a predetermined direction. In the disclosed embodiment, the external centrifugal radial fins 162 are pitched or tilted relative to the axis of rotation as best shown in FIG. 12. As will be understood by those skilled in this art, the external centrifugal radial fins 162 may be formed in a spiral or pitch prior to assembly in the filter apparatus 110 or the fins may be planar and pitched during assembly by securing the ends into the upper and lower bracket members 166 and 168 as shown in FIG. 12. The internal centrifugal radial fins 162 in the disclosed embodiment are spiral and secured by welding, brazing, or other methods of attachment to the 202 in a spiral around the rod as shown in FIG. 11. As used herein, the term "canted" includes any tilt or angle, including spiral, generating a radial or axial force on the liquid in a desired direction to improve filtering. To further increase the rotational force on the liquid, the liquid waste is directed through the inlet 120 tangentially into the first annular filtration chamber 130 as also shown in FIGS. 9 and 10. The liquid waste is injected under pressure tangentially through the inlet port 120 into a spiral passage and exits through outlet 204 into the annual first filtration chamber 130 generating an additional centrifugal force.

Having described the basic components of the centrifugal filter apparatus 110, the method of filtration by the filter apparatus 110 will now be understood by those skilled in this art. The liquid to be filtered is injected under pressure into the inlet 120 and the liquid is then directed through the passage in the upper housing member 123 into the annular first filtration chamber 130, tangentially in the disclosed embodiment. The liquid to be filtered is very rapidly rotated in the annular first filtration chamber 130 by rotation of the external centrifugal radial fins 162, driving heavier or denser material in the filtrate radially outwardly under centrifugal force against the cylindrical inner surface 133 of the housing wall 132. The solids are also driven downwardly against the cylindrical inner surface 133 to the solids outlet 122 adjacent the cylindrical inner wall 133. During filtration, the internal centrifugal radial fins 164 are rotated to drive supernatant liquid downwardly toward the outlet 121, drawing liquid through the helical filter element 112 into the second filtration chamber 131, providing a final filter for the liquid waste. As will be understood from the above description of the filtration apparatus 10 in FIGS. 1 to 6, the filter pores 60 between adjacent coils may be adjusted to filter solids of any dimension or size. Further, in this embodiment of the centrifugal filter apparatus 110, much of the filtration is accomplished by the external centrifugal radial fins 162 which drive solids radially outwardly to the solids outlet 122. The helical filter element 112 of the centrifugal filter apparatus 110 of this invention may be easily backwashed quickly by injecting air through pneumatic port 138, raising the piston 140, opening the filter pores and driving backwash liquid through the supernatant outlet 121. This reversal in the direction of rotation of the internal centrifugal radial fins 162, driving backwash liquid through the helical filter element and the external radial fins 162 then drives the liquid radially outwardly through the solids outlet 122.

The dual chambered centrifugal and compressive filtration apparatus 110 will separate fluids and suspended solids into components based upon their respective densities by an integrated combination of centrifugal and filtration mechanisms. Incoming fluids containing solids are rotated at selected velocities, for example, 10,000 revolutions per minute, to achieve waste solids liquids separation in the millisecond to second range. This generates G-forces in the 13,000 range in a cannister whose radius is 15 cm. Solids separate from suspended fluid in this gravitational field at clearing times proportional to their densities and masses. The suspension introduced at the inlet 120 deposits on the cannister inner cylindrical surface 133. Upon clarification, liquid media is forced through the helical filter element 112. Heavy particles will clear quickly into the space between the external centrifugal radial fins 162 and the filter cannister's wall 133. It will be noted that the direction of rotation of the external fins 162 corresponds to the direction of flow of the incoming solids and fluid suspension through inlet 120. This parallel flow, where the suspended solids are introduced adjacent the outer surface subjects the dense and more massive particles to maximum G-forces, at the point of greatest radial distance from the center of rotation. The solids dewater and collect at the inner surface 133 of the cannister housing, thereafter continuing to rotate downward toward the solids output or exit 122. The aspect ratio cross-section to cannister height may vary from 4:20 to 4:1 depending on volume throughput and time sedimentation time requirements. The solids clearing (sedimentation) time (T) is proportional to radial distance from the center of rotation (r), velocity ($v_f$) and density (dm) of fluid medium, particle density ($d_p$), diameter ($D^2$) and a rotational velocity ($RPM^2$). From calculations using $T = r/v_{fxD}^2 (d_m - d_p)_{xRPM2}$, where r and D are in cms., the clearing times for waste particles are calculated to be in the millisecond to second ranges at $10^4$ RPMs, well within the dwell times within this centrifugal filtration device, if the volume is 20 gallons and the flow rate were to be 60 gallons per minute.

As set forth above, the external and internal centrifugal radial fins 162 and 164, respectively, may be canted with pitch values to reduce materials drag at high G-forces and to facilitate uniform radial transport in that field with maximum sheer and solid particulates. As used herein, "canted" includes angle or pitch as shown, for example, by the angled external centrifugal radial fins 162 in FIG. 12 or the fins may be spiral as the internal centrifugal radial fins 164 spirally surround the central drive rod 202. The pitch values may also vary from top to bottom of the cannister in a spiral manner, for example, to further reduce shear of incoming solids. The solids introduced at 120 are subjected to centrifugal forces acting on the solids; the suspending fluids, however, are driven by both centripetal (central orienting pressures) forces and negative (pull) pressures exerted by the internal centrifugal radial fins 164. The suspended fluids are thus clarified. The combination rapidly and completely separates solids and liquids, without the use of thickening or flocking chemistries. It is apparent that the internal and external centrifugal radial fins 162 and 164, respectively, along with line pressure force clarified fluids and solids to exit that their respective outlets 121 and 122, respectively. The centrifugal fins simulate a conventional centrifuge head, except that the cannister (head equivalent) is stationary and the fluids or solids are in motion. The non-sedimentation solids rotate in a neutral zone surrounding the helical filter 112 to be removed and combined with the solid fraction upon periodic backwash. These sedimented solids exit the cannister or housing adjacent the cylindrical inner surface 133 of the cannister housing 132 through solids outlet 122.

As will be understood, the centrifugal filter apparatus 110 of this invention may be used to remove microscopic and submicroscopic particles from an industrial stack, combination engine exhaust, syngases generated by gasifiers and valuable machine oils. To extend the range of the filtration to submicroscopic levels, the helical coils 114 may include radial grooves or micropores as shown at 64 in FIG. 3 for filtration of submicroscopic particles when the helical filter element 112 is substantially fully closed as shown in FIG. 8. The backwash will take no longer than three seconds and may only infrequently be required due to the continuous removal of essentially all of the suspended solids by the centrifugal action of the external centrifugal radial fins 162. The backwash cycle is either called through computer-activated relays in response to an in-line pressure transducer at the inputs or is routinely set to occur at some time interval. Backwash cycles in a dual chambered centrifugal of this invention is capable of flow reversal of clean filtrate back thought its core, through its filter, and out through the solids outlet carrying retentate with it, may be initiated in any sequence, either though individual units or in pairs or simultaneously through all units in parallel. If the central flow reversing internal radial fins 162 are not included in the filter unit, backwash may still be accommodated, whereby diverting a portion of the clean fluid of one filter of a pair to its parallel sister though split stream valves momentarily flushes the second unit. Repeat of the shared cleansing cycle completes the paired backwash. In the disclosed embodiment of the centrifugal filter apparatus 110, filtration and driver shaft units are pressure sealed internally with seals 206 as shown in FIGS. 7 and 8. Further, because the external centrifugal radial fins 162 are rotated at very substantial velocities, the spindles bearings 208, such as fully caged brass or ceramic bearings.

The centrifugal filter apparatus 110 may be used for clarifying used machine or vehicle oils, which are known to contain a wide distribution of metallic, silicone and plastic solids contaminants from millimeter to micron size. Rancid oils also contain colonial bacterial forms with cross-sections exceeding ten microns. Clarification improves the ability of reprocessing plants to recycle such waste products for reuse as machine or engine lubricants or as fuel blends for power plants. Most oils contain polar emulsifying agents to assist in the suspension of solid particulates, water and chlorinated paraffins. These emulsifying water-oil-particulate fractions, referred to as micelles are found to form size-specific cross-sections in the range of 250 microns and 50 microns. The flat wire helical filter element of this invention is found to break up these micelles as a consequence of frictional forces, assisted by heating. The flat wire helical coil filter element 112 breaks the emulsions in three phases, which the centrifugal filter will separate. After a micelle break-up with heat and passage through the helical filter element 112, the micelle cracks, releasing contained water, polar emulsifying agents, particulates, chlorinated paraffin, which all separate from useful oil in the centrifugal filter apparatus of this invention by a three-phase split.

The centrifugal filter apparatus 110 of this invention may also be combined with ancillary equipment for further clarification of the liquid and drying of the solids. For example, the liquid or supernatant outlet 121 of the filter cannister may be directed to a chelating or ion exchange adsorbent column to remove soluble (waste) chemicals. The liquid supernatant may be passed through a resin column, further purifying the liquid. To achieve further drying and sterilization of the solids exiting the filtration apparatus through solids outlet 122, the partially dry solids may be directed into a filter press consisting of a compressive element as shown at 54 in FIG. 2 having a piston compression, for example, wherein the partially dried solids are heated and compressed depending upon the application. This compression element is not, in this instance, used to adjust the filter's pores or apertures but to apply pressure to the solids fed to the filter's core though 22. This modification uses the filter's pores to retain the solids while expressing the liquid phase through 20. The base plate 18 may include a sliding valve which is triggered to open when the piston element driven by the shaft 52, below 54, has reached maximum extension as measured by the driver motor 46.

FIGS. 13 to 18 of this application disclose a third embodiment of a filter apparatus or separator filter apparatus 210 which may be used to filter and separate or purify various fluids, including liquids and gases. In one disclosed embodiment, the filter separator 210 may be used to purify syngas and remove suspended waste particulates and waste gaseous oxides of nitrogen, sulfur or carbon. It is well known that in the process of gasification of biomaterials, particulates in the micron size range as well as the noted contaminating oxides are generated. These contaminate the syngases ($CO/H_2$). CaO (hot lime) or other metal oxides in the gas separation to form $CaCO_3$, $CaSO_4$ and $Ca[NO_3]_2$ as discussed further below, a metal oxide, such as CaO separates contamination gases from the fuel gases or syngases which can be subsequently stripped of gaseous contaminants and regenerated by periodic heating at calcination temperatures in the 1200° F. range as also discussed below.

Figure 13:
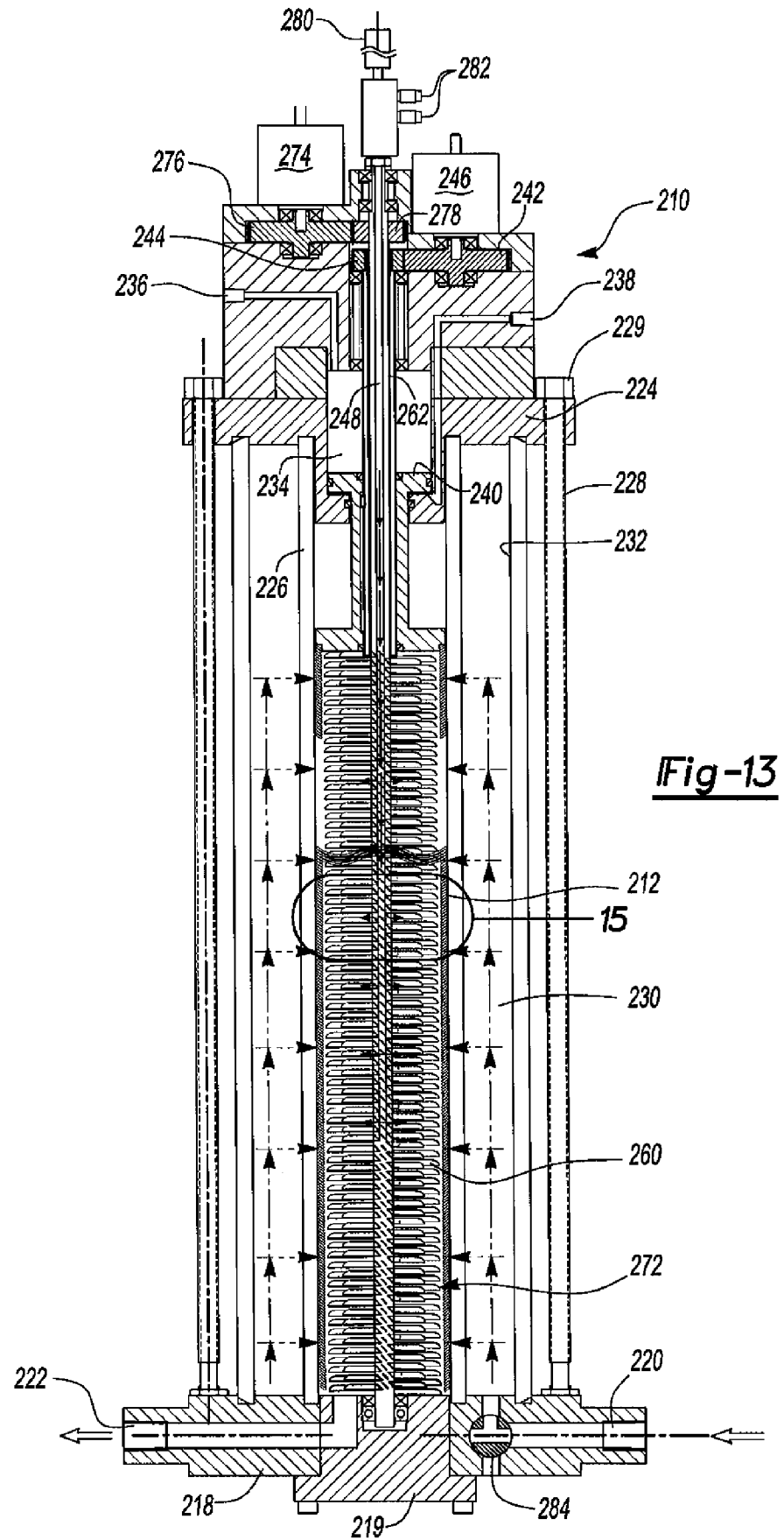
FIG. 13 is a side partially schematic side cross-sectional view of one embodiment of a fluid separator filter of this invention.
Figure 14:
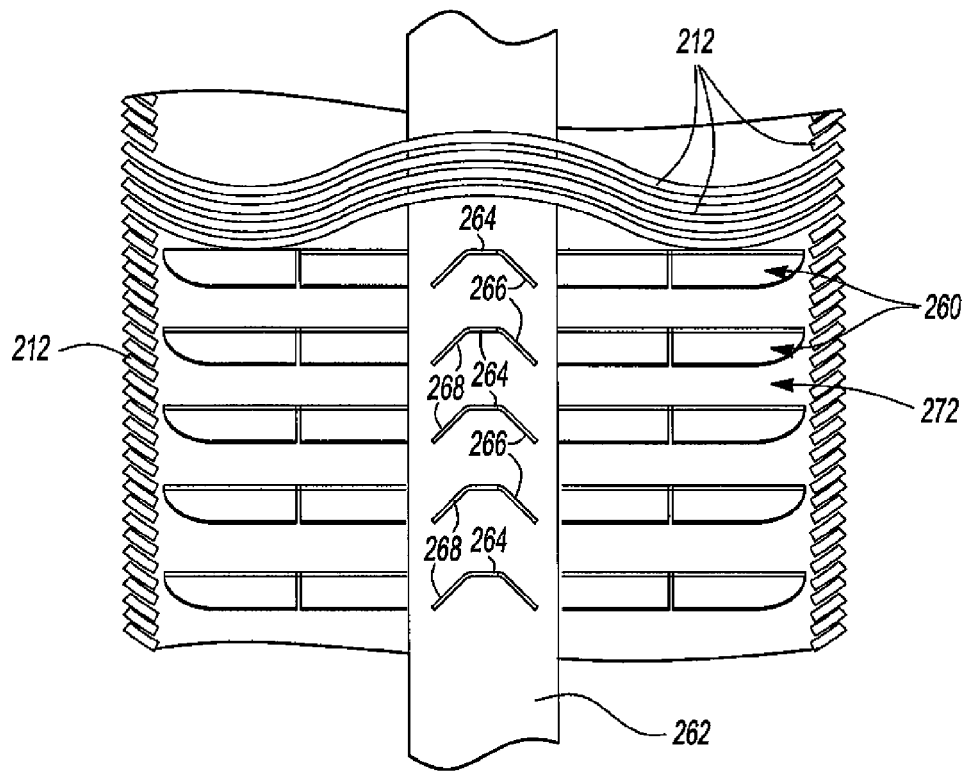
FIG. 14 is an enlarged partial side cross-sectional view of the embodiment of the fluid separator filter shown in FIG. 13.

The filter separator 210 shown in FIG. 13 includes an annular microfilter 212 which may be identical to the annual filters 12 and 112 described above with respect to FIGS. 1 to 9. The filter separator 210 includes lower housing members 218 and 219 which include a fluid inlet 220 and fluid outlet 222. The filter separator apparatus 210 further includes a cover 224, and inner retention posts 226 and outer retention bolts 228 which secure the cover 224 to the lower housing members 218 with nuts 229. As would be understood from the above description of the filter separator apparatus 210, the components of the filter separator apparatus 210 have been numbered in the same series where possible as the filter apparatus 10 and 110 described above but in the 200 series.

The disclosed embodiment of the filter separator apparatus 210 includes an outer wall 232 defining an enclosed filter canister defined by the cover 224 and the lower housing member 218, 219 and the other wall 232. However, in this embodiment, the outer wall may be any convenient shape. The disclosed embodiment of the filter separator apparatus 210 shown in FIG. 13 includes a pneumatic cylinder 234 having a first pneumatic inlet 236 and a second pneumatic inlet 238 which move the piston assembly 240 upwardly or downwardly as described above particularly with reference to FIG. 7. That is, the first pneumatic inlet 236 drives the piston assembly 240 downwardly as shown in FIG. 13 and the second pneumatic inlet 238 may be utilized to raise the piston assembly to adjust the compression of the helical coil annular microfilter 212 as described above. In this embodiment, the filter separator apparatus 210 also includes an actuator motor 246 having a shaft connected to a first gear 242, driving a second gear 244 connected to a rotatable shaft or drive shaft 248 connected to one of the coils, such as the upper coil of the helical annular microfilter 212. As described above, the motor 246 may be a conventional stepper motor, which is a brushless synchronous electric motor that can divide a full rotation into a large number of steps, for rotating one coil of the continuous helical coil relative to the remaining coils for moving the peaks and troughs into and out of registry as described above with reference to FIGS. 4 to 6. In one preferred embodiment, the annular microfilter 212 includes flat upper and lower surfaces 14 and a plurality of surfaces circumferentially spaced radially grooves or laser etched microgrooves or pores 64 as shown in FIG. 3. As discussed below, where the filter separator apparatus 210 is utilized to filter and purify a gas, the individual interconnected coils of the helical annular microfilter are preferably rotated into registry, such that the filter pores are limited to the radial grooves 64 shown in FIG. 3.

Figure 15:
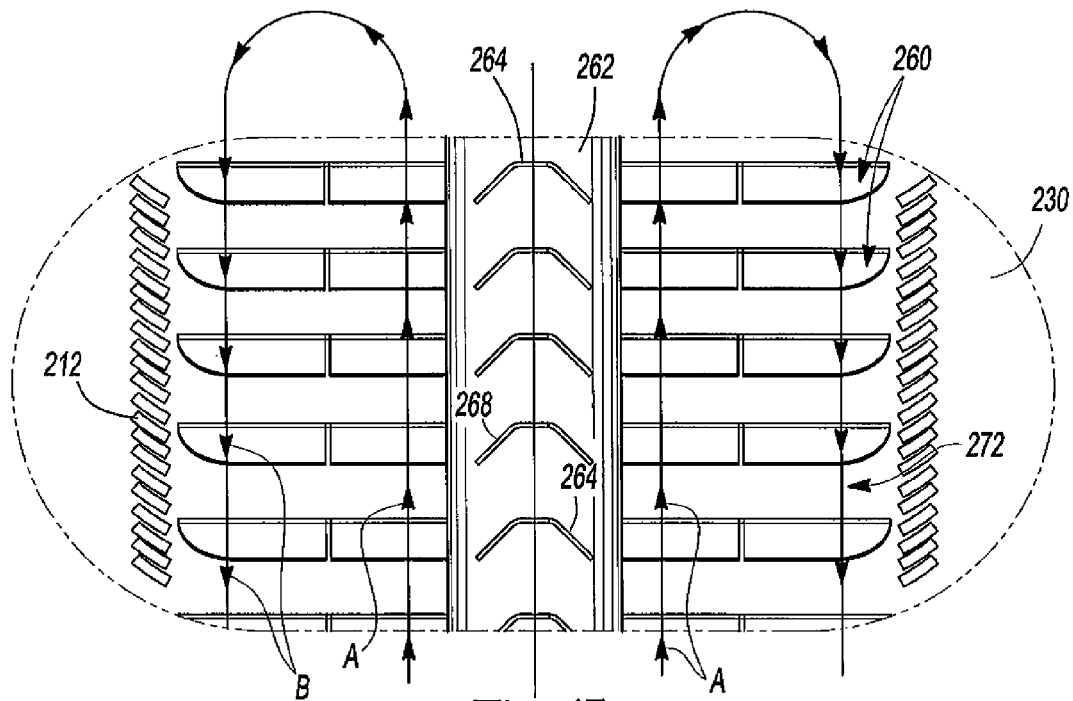
FIG. 15 is an enlarged partial side cross-sectional view of FIG. 14 illustrating the fluid circulation in the fluid separator filter.

In the disclosed embodiment, the filter separator apparatus 210 includes a plurality of radial mixing blades 260 rotatably mounted on a hollow shaft 262 as best shown in FIGS. 14 to 16 and 18. As shown in FIG. 15, the mixing blades 260 preferably circulate the fluid upwardly adjacent the central shaft as shown by arrows "A" and downwardly adjacent the annular microfilter 212. However, the circulation can also be reversed. This vertical circulation results in full mixing of the fluids with adsorbent particles for separating fluids as described below.

In the disclosed embodiment, each of the radial mixing blades 260 include a radial central portion 264 extending perpendicular to a rotational axis of the hollow shaft 262 and generally horizontally, The mixing blades 260 further include a first side portion 266 adjacent the hollow shaft 262 extending radially and circumferentially at an obtuse angle relative to the radial central portion 264 as shown in FIGS. 16 to 18, and a second side portion 268 spaced radially from the first side portion 266 extending from an opposite side of the radial central portion 264 extending radially and circumferentially at an obtuse angle to the radial central portion. As best shown in FIG. 18, the hollow shaft 262 includes a plurality of circumferentially spaced mixing blades 260 which are also spaced axially along the central shaft 262. The hollow central shaft also includes a plurality of radial apparatuses as best shown in FIG. 18. Upon rotation of the hollow shaft 262 in a counterclockwise direction as shown in FIG. 16, the first side portions 266 circulate fluid in the separation chamber 272 vertically upwardly as shown by arrows "A", and the second side portions 268 circulate fluid vertically downwardly as shown by arrows "B" in FIG. 15.

The filter separator apparatus 210 further includes a second motor 274, such as an electric motor, having a drive shaft connected to a drive gear 276 which drives a driven gear 278 fixed relative to the hollow shaft 262. Thus, the second motor 274 will rotate the hollow shaft 262 and the mixing blades 260 as described above. The disclosed embodiment of the filter separator apparatus 210 further includes an injector 280, such as an air torch, for injecting fluid into the separation chamber 272 and the apparatus may also include further injection ports 282 for injecting fluid into the separation chamber 272. In the disclosed embodiment, the inlet 220 also includes a three-way valve 284 for controlling passage of fluid from the inlet 220 into the filtration chamber 230.

Having described one preferred embodiment of the filter separator apparatus 210, the method of filtering and separating various fluids by the method of this invention may now be described. The filter separator apparatus 210 may be utilized to filter and separate or purify various fluids, including liquids, such as water and various gases, such as syngas. As set forth above, synthesis gas or syngas which is a mixture of carbon monoxide and hydrogen may be converted into hydrocarbons of various forms by the Fischer-Tropsch process by the formulation above. As will be understood by those skilled in this art, syngas or synthesis gas refers to the final use of the gas and is thus sometimes referred to a fuel gas. Now, with the understanding that the filter separator of this invention may be utilized to filter and separate or purify various fluids, including liquids and gases, the method of this invention will now be described with reference to a method of purifying syngas consisting essentially of carbon monoxide and hydrogen.

Syngas, including waste gaseous oxides of sulfur, nitrogen or carbon and suspended fine waste particulates are received under pressure in the annular filtration chamber 230 through the inlet 220 and three-way valve 284 as shown. In the method of filtering and purifying gases, as opposed to liquids, the annular microfilter is preferably in the "closed" position, wherein the stepper motor 246 rotates an upper coil (as shown in FIG. 6), such that the coils are in the trough-to-trough position. As will be understood, the spacing between the coils of the annular microfilter 212 in FIGS. 14 and 15 has been exaggerated for clarity. In the closed position, wherein the piston 240 is extended by air pressure through pneumatic port 236 as shown in FIG. 13, the coils are in surface-to-surface contact and the only filter pores are through the radial grooves or laser etched micropores 64 shown in FIG. 3. As would be understood, the size of the radial grooves would depend upon the waste particulates to be filtered; however, it is anticipated that the grooves or laser etched micropores will have a diameter of 10 micrometers or less into the nanometer range. The filtered gas is then transferred through the radial grooves 64 (see FIG. 3) of the microfilter 212 into the separation chamber 272. As described above, the gas in the separation chamber 272 is circulated vertically upwardly and downwardly as shown by arrows "A" and "B" in FIG. 15 by the rotating mixing blades 260. Where the filter separator apparatus 210 is used to purify syngas, the separation chamber 272 includes fine gas adsorbent metal oxide particles, such as calcium oxide particles from kiln dust from a cement kiln. As would be understood by those skilled in this art, various adsorbent metal particles may be used, but calcium oxide particles from kiln dust is inexpensive and effective. The fine adsorbent particles adsorb waste gas in the separation chamber 272, including gaseous oxides sulfur, nitrogen or carbon. The rotating mixing blades circulating gas and adsorbent particles upwardly and downwardly as described above, ensure uniform mixing of gas and solid phases for maximum adsorbent efficiency. The oxides, except for carbon monoxide and hydrogen, on passing through the filter bind with the adsorbent. The filtered and purified syngas is forced through the moving adsorbent column and out of the gas outlet 222.

The adsorbent, enclosed by the pitched and bidirectional mixing blades 260 eventually becomes saturated with unwanted gaseous oxides. Carbon dioxide sensors or pressure transducers to monitor adsorbent saturation or filter occlusion may be provided at the outlet 222. If the frequency of the saturation events are known, a purging cycle of the filter and adsorbent may be initiated at an appropriate time interval to avoid saturation or occlusion. This may be accomplished with an air torch 282 which directs a dry and carbon dioxide free gas, such as hot nitrogen, under pressure into the hollow shaft 62. This purging gas is forced axially and radially through the radial openings 270 shown in FIG. 18 into the separation chamber 272. The purging gas is then forced through the saturated adsorbent, desorbing gaseous oxides of sulfur, nitrogen or carbon, which are forced through the filter and out of the gas inlet 220. While the filter during its filtration mode relied upon the laser-etched micropores 64 shown in FIG. 3, during purging, however, the filter is preferably opened incrementally by reversal of the stepper motor 246, thus rotating the spiral coils out of registry preferably to a stop (not shown) while extending the coil through the open position by injecting compressed gas through the pneumatic port 238, wherein the aperture openings allow passage of purging gas as indicated at a greater velocity to remove particles adhering to the outer surface of the annular microfilter 212 and discharge with the purging gas. The purging gas must be preheated in the air torch 282 to 1200° F. in order to remove bound $CO_2$, $NO_R$, $SO_x$ and water from the adherent particles. In this manner, the fuel gas undergoes a self-cleaning cycle.

As set forth above, the fluid separator 210 may be used for filtering, separating and purifying various gases and liquids. For example, chelating agent resins or ion exchange agent resins may be injected into the column through the outlet ports 222 and water may be purified of dissolved solid waste or organic ions or cations. Such resins may be regenerated by sequential additions of an acid and base through injection ports 282 to strip adsorbed substances from the resin and regenerate its preferred surface charges. Further, as would be understood by those skilled in this art, various modifications may be may be made to the filter separator apparatus 210, the method of filtering, separating and purifying fluids disclosed herein and the fluid mixing and circulating provided by the mixing blades 260 within the purview of the appended claims. For example, various mixing devices may be utilized in the separation chamber 272; however, in a preferred embodiment, the mixing device circulates the fluid upwardly adjacent either the annular microfilter 212 or the axis of the separator chamber and downwardly as described to provide thorough mixing of the adsorbent particles and the fluid containing waste. Further, other annular filter elements may be used in place of the helical coil annular microfilter 212 as disclosed in FIGS. 3 to 6 depending upon the fluid being filtered. However, where the filter separator apparatus 210 of this invention is utilized to filter and separate or purify gases particularly syngas, the annular microfilter 212 has several advantages as described above. Further, as set forth above the filter cannister defined by the annular wall 232 may be any convenient shape including, but not limited to, cylindrical.

The third embodiment of the apparatus 310 of this invention is particularly, but not exclusively adapted to generate gaseous hydrocarbon fuel from a carbon based synthesis gas, such as syngas or a fatty acid ester or other partially oxidized bio-molecules. As described above, syngas or synthesis gas is a mixture of carbon monoxide and hydrogen and is sometimes referred to fuel gas. The syngas may be generated by the filter apparatus 210 described above or any other suitable apparatus producing a substantially pure filtered mixture of carbon monoxide and hydrogen. As known by those skilled in this art, fatty acid esters may be generated from spent cooking oils by a reaction with lye (NaOH) and methylo alcohol. As will be understood by those skilled in this art, other partially oxidized bio-molecules may include bio-acids, aldehydes and keytones generated by pyrolysis or other means.

Figure 19:
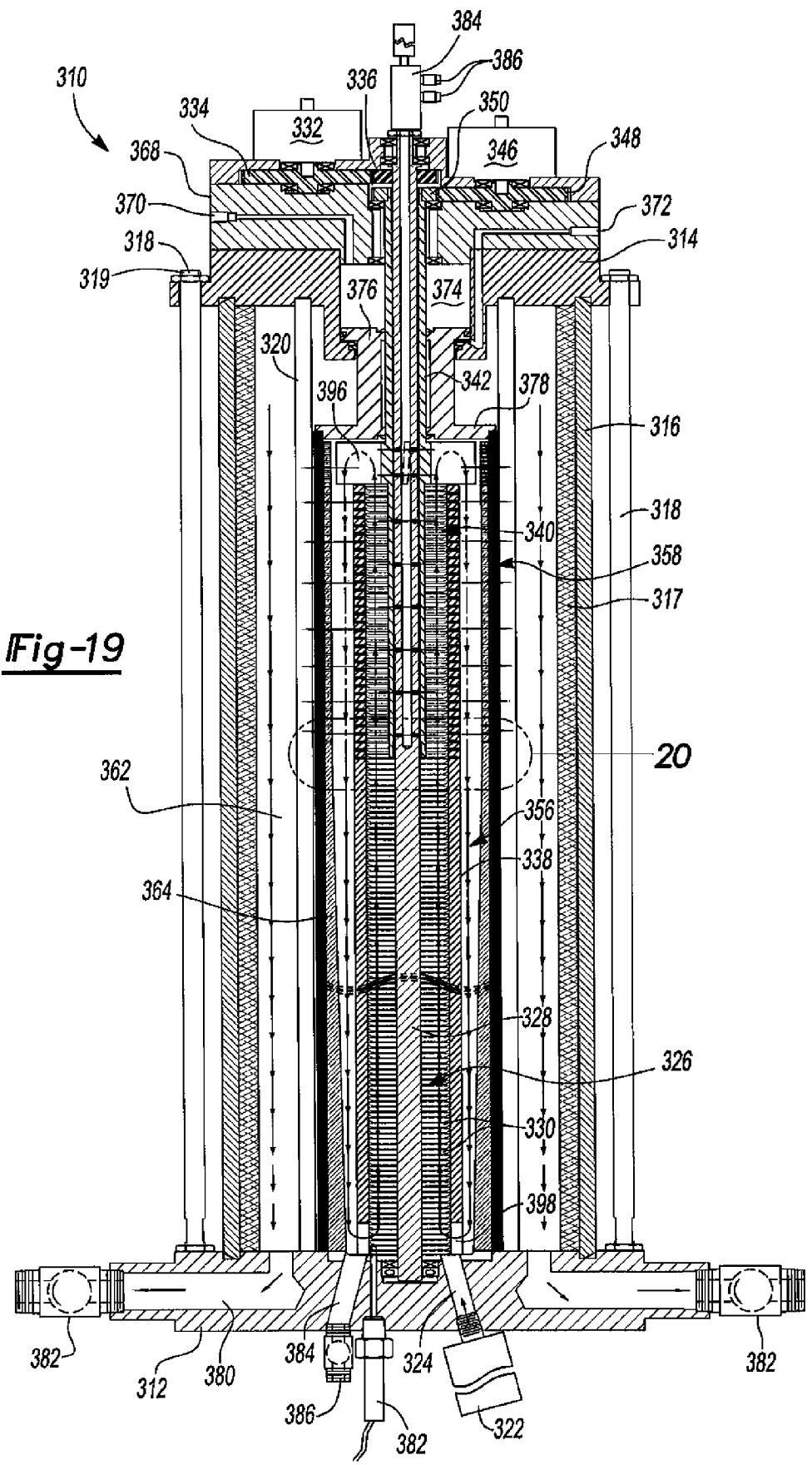
FIG. 19 is a side partially cross-sectional side view of an apparatus suitable for generating gaseous hydrocarbon fuel of this invention.
Figure 20:
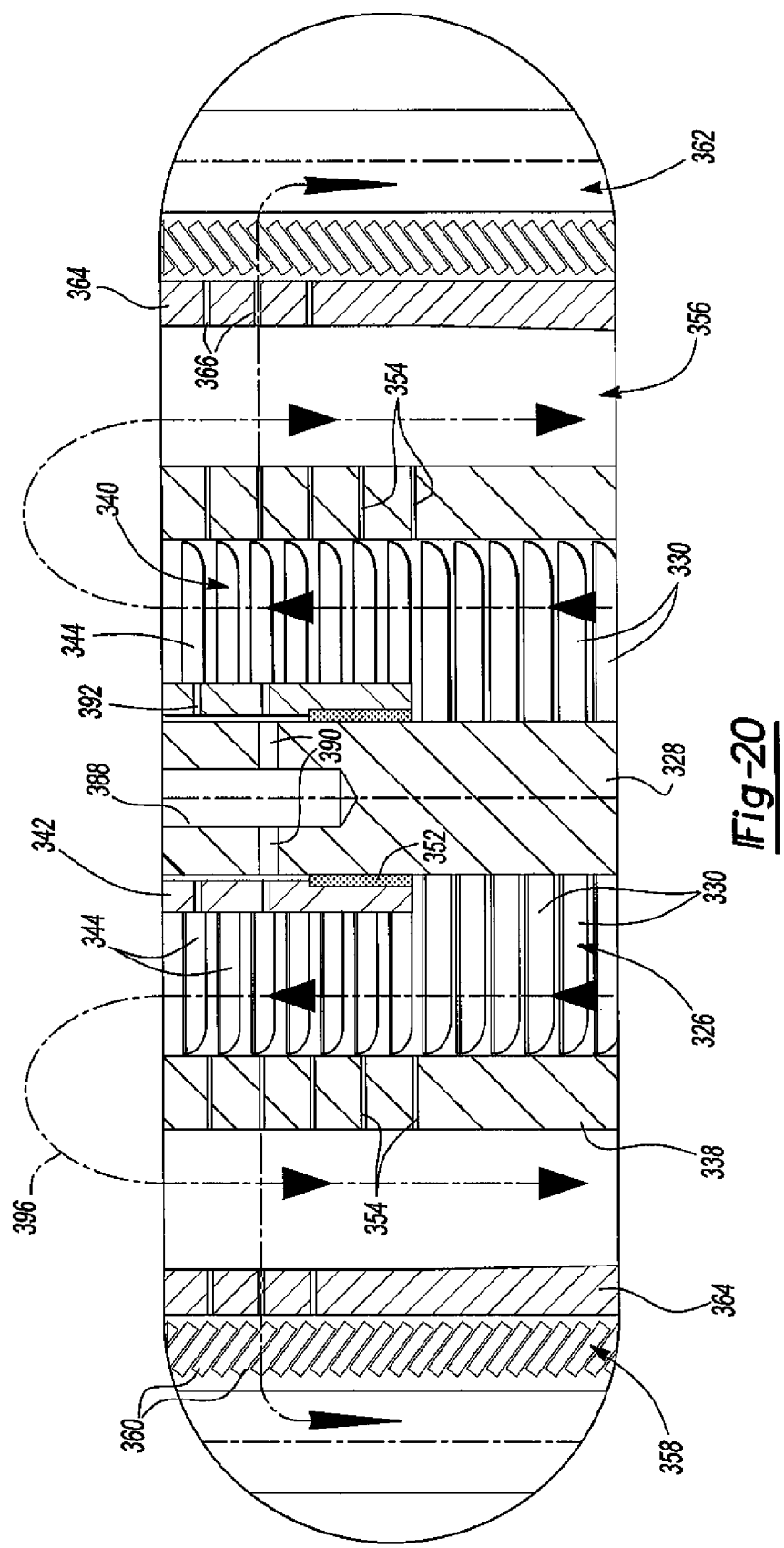
FIG. 20 is an enlarged view of the encircled portion of FIG. 19.
Figure 21:
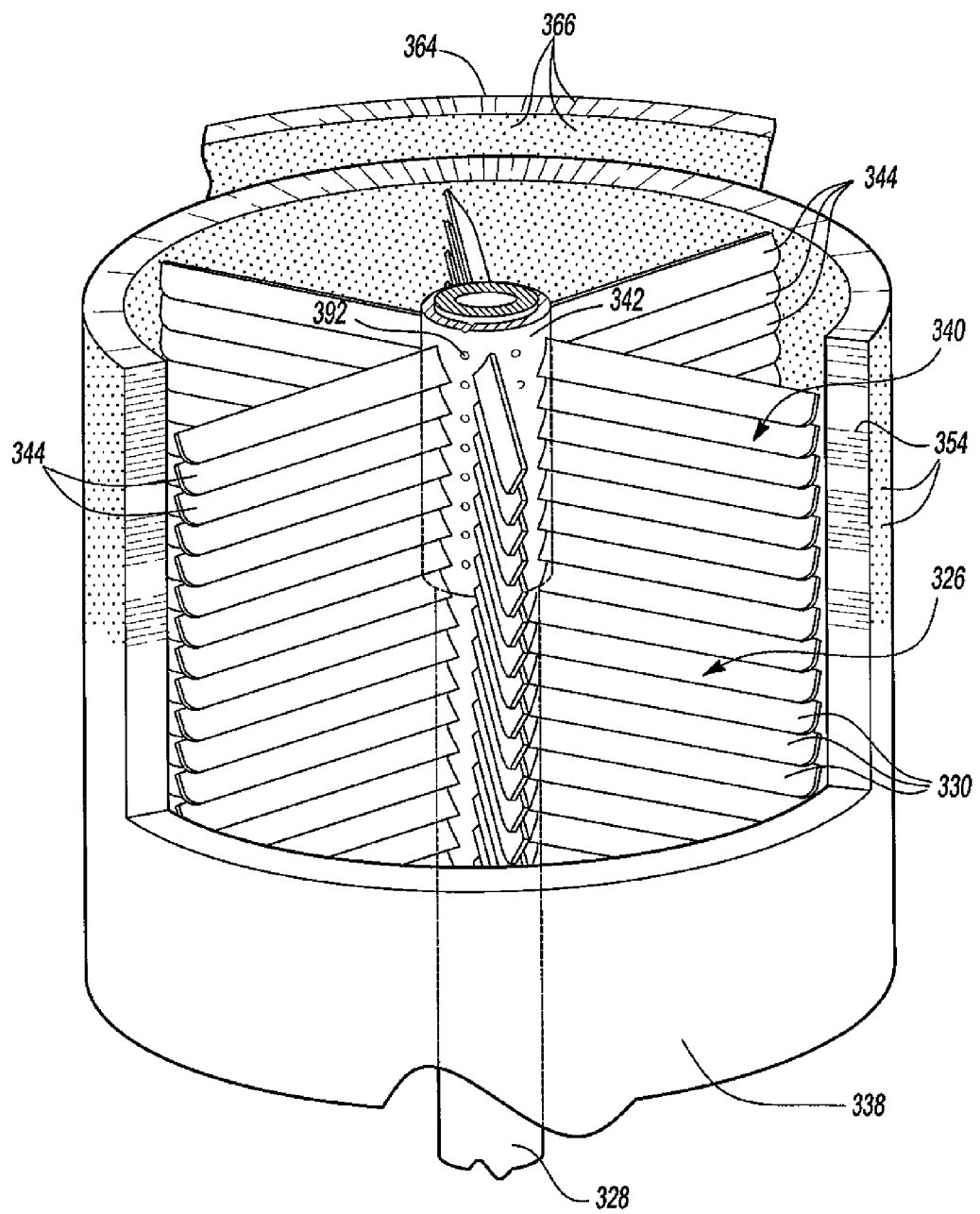
FIG. 21 is an enlarged partial plane view of one embodiment of the mixing blades in the apparatus shown in FIG. 19.

The apparatus suitable for generating gaseous hydrocarbon fuel 310 disclosed in FIGS. 19-21 includes a lower housing member 312, an upper housing member 314 and a cylindrical canister enclosure 316 enclosing the apparatus. In this embodiment, because of the high temperature of the reaction and stripping chambers described below, an insulation cylinder 317 is provided inside the housing enclosure 316. The components of the canister are retained by outer retention posts 318 retained to the upper housing member 314 by nuts 319 and inner retention posts 320. In the disclosed embodiment, heated carbon based synthesis gas is injected into the apparatus under pressure through an air torch 322 through inlet 324 into a central reaction chamber 326 adjacent the lower housing member 312. The reaction chamber 326 includes a central or axial rotating shaft 328, which is sometimes referred to herein as the first rotating shaft having a plurality of circumferentially and axially spaced radial blades 330, sometimes referred to herein as the first radial blades. A drive motor 332 having a drive shaft connected to a drive gear 334 meshes with a driven gear 336 fixed to the first rotating shaft 328, rotating the shaft 328 and the circumferentially and axially spaced first radial blades 320. As shown in FIG. 21, the first radial blades 330 are pitched or angled relative to the axis of the shaft 328 at an angle of less than 30°, or between 5° and 30°, more preferably between 10° and 20° or about 15°. In the disclosed embodiment, the reaction chamber 326 is surrounded by a tubular baffle 338, which in the disclosed embodiment is impervious surrounding the reaction chamber 326. The canted first rotating blades circulate a carbon based synthesis gas, fine particulate catalyst and the hydrocarbon fuel reaction product upwardly in the reaction chamber 326 into the stripping chamber 340.

Hydrocarbon fuel loosely bound to the catalyst particles is received in the stripping chamber 340 from the reaction chamber 326. The hydrocarbon fuel is stripped from the catalyst particles in the stripping chamber 340, The stripping chamber includes a central or axial rotating shaft 342 which is referred to herein as the second rotating shaft. The second rotating shaft 342 also includes a plurality of circumferentially and axially spaced canted radial blades 344 which circulate the catalyst particles upwardly and the fuel gas radially as described below. The second rotating shaft is independently driven by second drive motor 346 preferably at a greater rotational speed than the first rotating shaft 328 in the reaction chamber 326. The drive shaft of the second drive motor 346 is connected to a drive gear 348 which meshes with a driven gear 350 connected to the second rotating shaft 342. In the disclosed embodiment, the second rotating shaft 342 is tubular and telescopically received on the first rotating shaft 328 as shown in FIG. 20 and suitable bearings 352 are provided to rotatably support the second rotating shaft 342 on the first rotating shaft 328 as also shown in FIGS. 20 and 21. In this embodiment, the upper portion of the tubular baffle 358 which surrounds stripping chamber 340 includes a plurality of radial ports 354. However, a separate tubular baffle 364 surrounding the stripping chamber 340 may also be used.

The disclosed embodiment of the apparatus 310 further includes a first annular collection chamber 356 surrounding the tubular baffle 358 as best shown in FIG. 20. The first annular collection chamber 356 is sometimes referred to herein as the particle collection chamber as it serves this function during operation. An annular microfilter 358 surrounds the particle collection chamber 356 as shown in FIG. 20. The disclosed embodiment of the annular microfilter 358 may be a continuous flexible resilient helical coil having a plurality of circular inner-connected helical coils 360 each having a regular sinusoidal shape as described above with reference to the filter elements 12 and 112. Further, in one preferred embodiment, the helical coils have flat top and bottom surfaces with radial laser microgrooves as shown at 64 in FIG. 3. A second annular collection chamber 362 surrounds the annular microfilter 358, sometimes referred to herein as the gas collection chamber, as best shown in FIG. 20. The disclosed embodiment of the apparatus 310 further includes a second outer tubular baffle 364 which includes radial perforations 366 surrounding the stripping chamber 340 as shown in FIG. 20. In the disclosed embodiment, the second outer tubular baffle 364 is also frustoconical as discussed in more detail herein below. In the disclosed embodiment, the second outer tubular baffle 364 is impervious surrounding the reaction chamber 326; however the second tubular baffle is optional.

The pneumatic control for the annular microfilter 358 will now be described. The apparatus includes a second upper housing member 368 having pneumatic ports 370 and 372, a piston chamber 374 and a pneumatic piston 376 movable within the piston chamber 374. The lower end 378 of piston 376 is connected the upper end of the annular microfilter coil 358. The pneumatic control for the annular microfilter 358 may be used to compress the filter coil and rotate an upper coil 360 relative to the remaining coils into and out of registry as described above. The filter coil 358 is compressed and rotated into registry by injecting air under pressure into port 370 and released by injecting air into the port 372. As would be understood by those skilled in the art, the pneumatic control may also be used to rotate the piston 376 and thus rotate the upper coil 360 of the continuous helical coil microfilter 358 into and out of registry as described above with respect to FIGS. 4-6.

The disclosed embodiment of the apparatus 310 further includes gas outlets 380 communicating with the annular gas collection chamber 362 having three-way valves 382. A thermocouple 382 having a temperature probe located within the reaction chamber 326 is provided for determining the temperature in the reaction chamber 326 and an auxiliary air inlet 384, controlled by valve 386, is either used to regulates chamber temperature or to recycle the particulate catalysts as described below. In the disclosed embodiment, the shaft 328 is hollow having an axial bore 388 as shown in FIG. 20 and the shaft 328 includes radial bores 390, such that hot gas injected into the axial bore 388 of the first central shaft 328 is injected into the stripping chamber 340 as described below. The apparatus further includes an air torch 384 for injecting hot gas through the axial bore 388 of the central shaft 328 and side ports 386 for injecting another gas or liquid into the stripping chamber.

Having described the components of the apparatus 310, the operation of the apparatus and method of generating hydrocarbon fuel from a carbon based synthesis gas will now be described. As set forth above, the disclosed embodiment of the apparatus 310 of this invention is particularly, but not exclusively adapted to generate hydrocarbon fuel from a carbon based synthesis gas. The method of generating hydrocarbon fuel will now be described with reference to the apparatus 310 described above. Heated carbon based synthesis gas is injected under pressure through the inlet 324 through the air torch 322 into the reaction chamber 326. The heated carbon based synthesis gas and a catalyst, such as cobalt or zeolite ZSM-5, in the form of fine particles preferably having a particle size of 10 microns or less is circulated upwardly through the reaction chamber 326 by the rotating circumferentially and axially spaced first radial blades 330. As set forth above, the circulation of the heated carbon based synthesis gas and fine particulate catalyst upwardly can be accurately controlled by the speed of rotation of the first radial blades 330, which are rotated by the first drive motor 332. As will be understood by those skilled in the art, the length of the hydrocarbon fuel chains will be determined by several factors, including the temperature and the dwell time of the carbon based synthesis gas and catalyst in the reaction chamber 326. Thus, the apparatus of this invention may be tailored to generating hydrocarbon fuel of a predetermined length, including for example octane or a diesel fuel. Various catalysts may be utilized with the apparatus of this invention including, for example, cobalt metal, iron and various co-catalysts for polymerizing syngas or zeolite ZSM-5 for polymerizing fatty acid esters, such as a fatty acid methyl ester. As would be understood by those skilled in the art, the hydrocarbon fuel produced in a reaction chamber 326 in the presence of a catalyst will be loosely bound to the catalyst.

The hydrocarbon fuel bound to the fine particulates of the catalyst is circulated upwardly in the reaction chamber 326 to the stripping chamber 340 by the rotating first radial blades 330. The hydrocarbon fuel is then stripped from the catalyst in the stripping chamber 340. This is accomplished as follows. First, the second radial blades 344 in the stripping chamber 340 are rotated at a much greater velocity than the first radial blades 330 in the reaction chamber 326. Second, very hot gas, such as nitrogen, is injected into the stripping chamber 340 in this embodiment through the air torch 394 which as discussed above, includes an axial bore 388 and radial ports 390 and 392. Further, the baffle 338 surrounding the stripping chamber 340 includes radial bores 354 as shown in FIG. 20. In one preferred embodiment, the radial bores 354 through the upper portion of the tubular baffle 338 have a diameter less than a particle size of the fine particulate catalyst or less than about one micron. Thus, the second rotating blades 344 in the stripping chamber 340 drive the hydrocarbon fuel radially outwardly through the tubular baffle 354 into the first annular particle collection chamber 356. However, the fine catalyst particles are circulated upwardly over the top of the tubular baffle 338 into the first annular collection chamber 356 as shown by arrows 396 in FIGS. 19 and 20.

The hydrocarbon fuel gas is further driven radially by the second radial blades 344 through the radial apertures 366 in the second outer tubular baffle 364 and through the annular microfilter 358 into the gas collection chamber 362. The catalyst particles are then collected in the annular particle collection chamber 356 and fall downwardly through the annular chamber 356 to the bottom of the apparatus. In the disclosed embodiment, the tubular baffle 338 is frustoconical as best shown in FIG. 19, guiding the catalyst particles radially inwardly to an annular particle collection area 398 adjacent the bottom of the inner tubular baffle 338. In the disclosed embodiment, the apparatus includes a hot air torch inlet 384. The valves 386 may be periodically opened to blow the catalyst particles into the reaction chamber 326 and the catalyst particles are then funneled into the updraft in the reaction chamber 326 by the pitched first radial blades 330. Alternatively, these valves 386 may be used in a backwash operation using cleaning fluids or as a feed inlet for liquid or gas (e.g., hydrogen) reducing agents to restore the reduced metallic state of circulating catalyst, partially oxidized in the process of their use. A thermocouple 382 is provided to continuously monitor the temperature in the reaction chamber 326 and the first motor 332 is operated to maintain optimum reaction conditions in the reaction chamber to generate the desired hydrocarbon fuel. As stated above, the apparatus of this invention may be utilized to generate various gaseous hydrocarbon fuels from methane to saturated and unsaturated target fuels, including for example octane.

The fine catalyst particles are recycled and regenerated and maintained in its reduced state by the stripping gas/liquid while being transferred up and over the tubular baffle 338. It is important to note that, during the reaction, interfering water generated by the polymerization reaction above is continuously removed from a reactor column along with hydrocarbon fuel in the stripping segment. Fischer-Tropsch reactors in current use and catalyst-promoter combinations all suffer from non-uniformity of its products due to the participation of catalysts in various degrees of oxidation. Stripping water continuously from the reaction products and removal of other contaminants from the incoming carbon based synthesis gas are essential features of the basic apparatus of this invention. Pumps are installed at 386 to provide for periodic withdrawal and renewal of spent catalyst particles. A backwashing cycle is periodically initiated by opening and closing the filter aperture. In the apparatus as disclosed in FIG. 19, the pneumatic piston 376 is driven by air pressure through pneumatic port 370 to its lowest position, rotating the coils 360 of the continuous filter coil 358 into registry as shown in FIG. 20, wherein the laser grooves 64 (FIG. 3) provide the filter pores having a diameter less than the particle size of the catalyst. During backwashing, the pneumatic piston 376 is raised by air pressure through pneumatic port 372 raising the piston 376 and opening the filter pores 60 shown in FIGS. 1 and 4. The filter is then backwashed by injecting air or other gas under pressure through the outlet 380 and through the annular filter 358 in the reverse direction, purging the filter. Backwashing of a filter can also be accomplished by injecting fluid through the valves 386 or by purging with gas through the air torch 384. This process is completed in seconds.

Having described a preferred embodiment of the apparatus of this invention and method of operation, the invention is now claimed as follows.

What is claimed is:

1. An apparatus suitable for generating gaseous hydrocarbon fuel from syngas, comprising:

a syngas inlet adjacent a lower end of said apparatus;

a central reaction chamber receiving heated syngas from said syngas inlet adjacent a lower end of said reaction chamber, said reaction chamber including a first axial rotating shaft having a first plurality of radial blades mixing and circulating heated syngas and fine catalytic particles upwardly in said reaction chamber generating gaseous hydrocarbon fuel bound to the fine catalyst particles;

a first tubular baffle surrounding said reaction chamber;

a stripping chamber located above said reaction chamber receiving gaseous hydrocarbon fuel and fine catalyst particles from said reaction chamber, said stripping chamber including a second independently driven rotating axial shaft having a plurality of radial blades rotating at a greater velocity than said first radial blades driving gaseous hydrocarbon fuel radially outwardly;

a source of hot stripping gas directing hot stripping gas into said stripping chamber stripping gaseous hydrocarbon fuel from the fine catalyst particles and maintaining the hydrocarbon fuel in a gaseous state;

a second tubular baffle having spaced radial openings surrounding said stripping chamber;

an annular particle collection chamber surrounding said first and second tubular baffles receiving catalyst particles from said stripping chamber;

a gas collection chamber surrounding said annular filter receiving gaseous hydrocarbon fuel through said annular filters; and a gas outlet communicating with said gas collection chamber directing gaseous hydrocarbon fuel out of said apparatus.

2. The apparatus as defined in claim 1, wherein said first tubular baffle is impervious and said second tubular baffle is an extension of said first tubular baffle.

3. The apparatus as defined in claim 1, wherein said second rotating axial shaft is tubular and telescopically received on said first axial rotating shaft.

4. The apparatus as defined in claim 1, wherein said second rotating axial shaft is hollow having radial pores opening into said stripping channel and said source of stripping gas directed into said hollow second rotating axial shaft into said stripping channel through said radial ports.

5. The apparatus as defined in claim 1, wherein said second tubular baffle includes a frustoconical internal surface adjacent a lower end directing catalytic particles radially inwardly into said central reaction channel.

6. The apparatus as defined in claim 1, wherein said first and second radial blades are pitched relative to a vertical axis at an angle of less than 20°.

7. The apparatus as defined in claim 6, wherein said second radial blades are rotated at 5,000 to 10,000 rpm, generating a G-force in excess of 10,000.

8. The apparatus as defined in claim 1, wherein said annular filter is a continuous flexible resilient helical coil having flat engaging top and bottom surfaces including circumferentially spaced radial notches defining filter micropores having a filter pore size less than a particle size of the fine catalytic particles.

9. The apparatus as defined in claim 1, wherein the apparatus includes a thermocouple having a probe in the reaction chamber controlling the temperature of an air torch directing hot synfuel into said reaction chamber.

\* \* \* \* \*